United States Patent [19]

Suzuki et al.

[11] Patent Number: 5,005,166
[45] Date of Patent: Apr. 2, 1991

[54] TIME AND WAVELENGTH DIVISION SWITCHING SYSTEM

[75] Inventors: Syuji Suzuki; Makoto Nishio, both of Tokyo, Japan

[73] Assignee: NEC Corporation, Tokyo, Japan

[21] Appl. No.: 251,486

[22] Filed: Sep. 30, 1988

[30] Foreign Application Priority Data

Sep. 30, 1987 [JP] Japan .............................. 62-248347
Dec. 1, 1987 [JP] Japan .............................. 62-305152
Jun. 2, 1988 [JP] Japan .............................. 63-136955

[51] Int. Cl.$^5$ .............................................. H04J 14/00
[52] U.S. Cl. ......................................... 370/1; 455/600
[58] Field of Search .................... 370/1, 3, 4; 455/600

[56] References Cited

U.S. PATENT DOCUMENTS

4,845,703  7/1989  Suzuki ................................. 370/3

FOREIGN PATENT DOCUMENTS

| | | | |
|---|---|---|---|
| 58-033069 | 3/1983 | Japan | 370/1 |
| 0158661 | 9/1984 | Japan | 370/1 |
| 0096893 | 5/1986 | Japan | 370/4 |
| 0184997 | 8/1986 | Japan | 370/3 |
| 0206997 | 9/1987 | Japan | 370/4 |
| 0050194 | 3/1988 | Japan | 370/4 |
| 0090696 | 4/1989 | Japan | 370/4 |

*Primary Examiner*—Reinhard J. Eisenzopf
*Assistant Examiner*—L. Van Beek
*Attorney, Agent, or Firm*—Sughrue, Mion, Zinn, Macpeak & Seas

[57] ABSTRACT

A time and wavelength (T×W) switch comprises a plurality of wavelength selectors for selecting a time division multiplexed (TDM) channel of a first wavelength from a plurality of incoming TDM channels of different wavelengths. A plurality of time-slot switches are connected respectively to the outputs of the wavelength selectors for switching a first time slot of the selected TDM channel to a second time slot. To the outputs of the time-slot switches a plurality of wavelength converters are respectively connected for converting the wavelength of the second time slot to a second wavelength. The T×W switches can be arranged as an incoming time and wavelength switching stage and an outgoing time and wavelength switching stage. An array of optical devices interconnecting the outputs of the incoming and outgoing stages constitutes an intermediate stage.

17 Claims, 18 Drawing Sheets

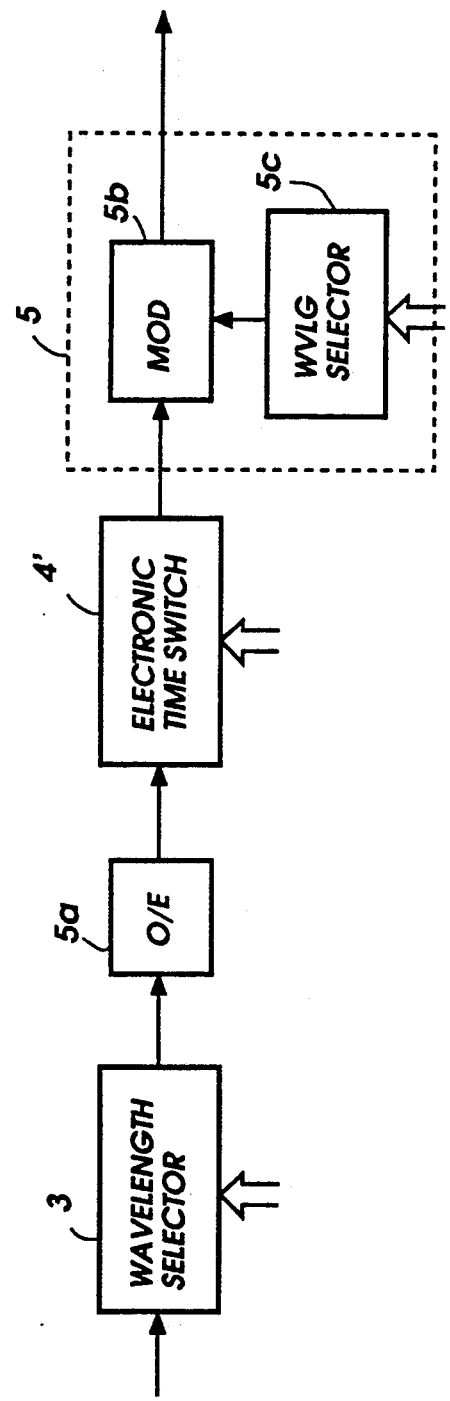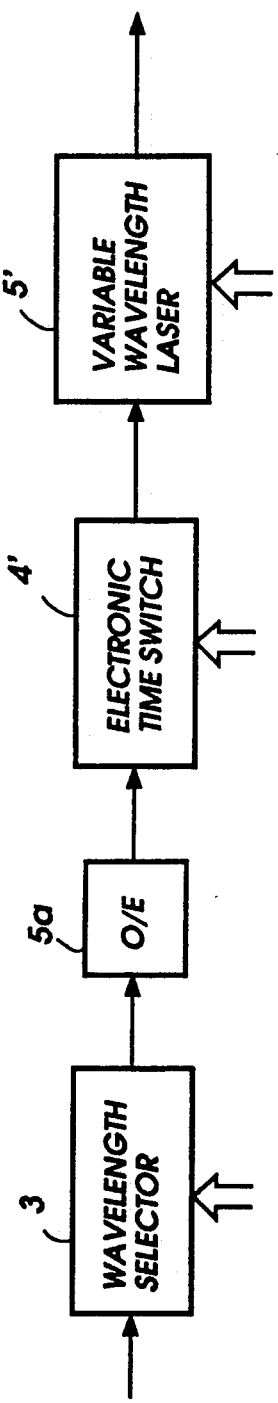

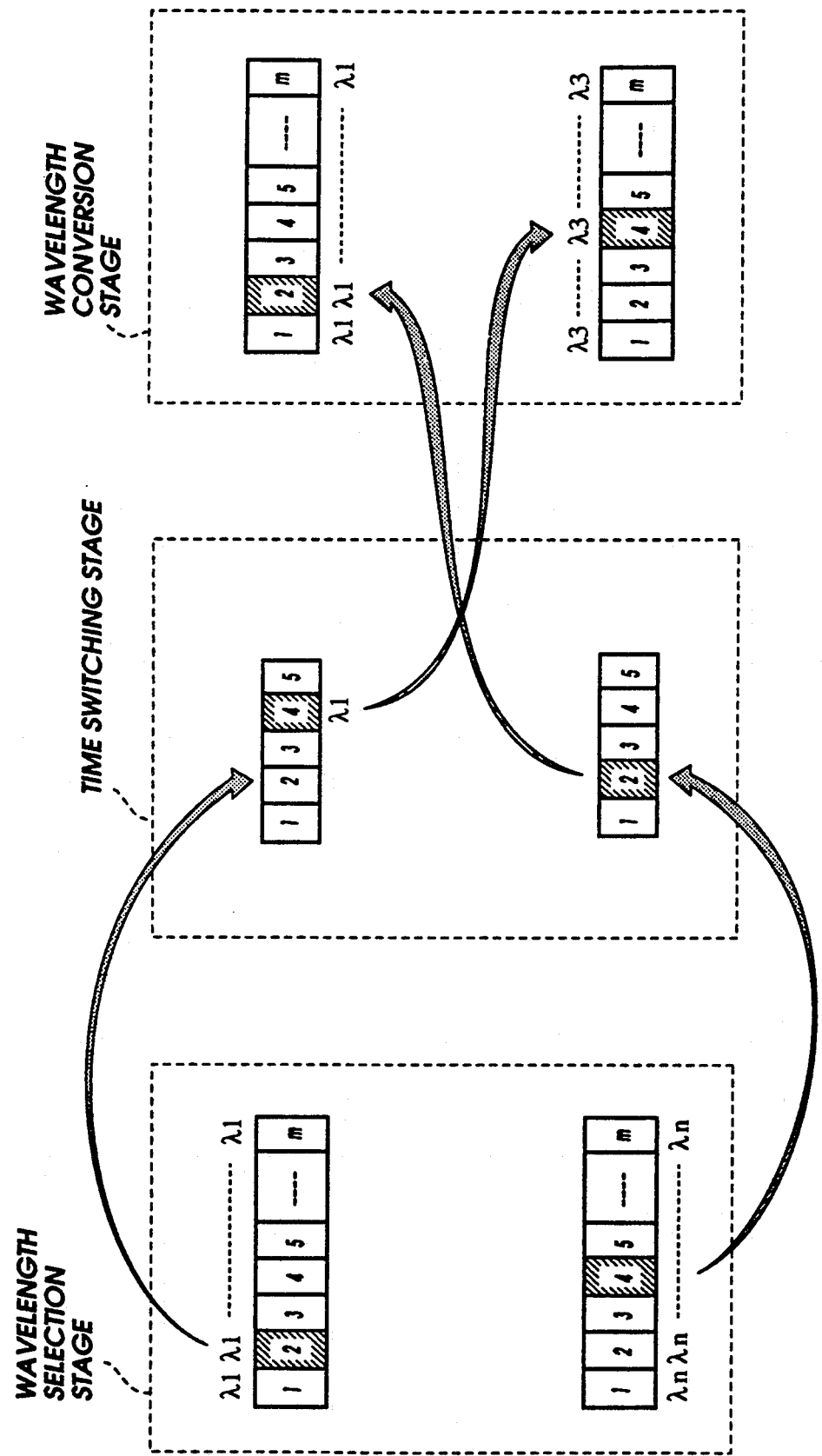

TIME AND WAVELENGTH DIVISION SWITCHING SYSTEM

BACKGROUND OF THE INVENTION

The present invention relates generally to an optical switching system, and more specifically to a wavelength time division multiplexed optical switching system in which optical signals are multiplexed both in time and wavelength domains to provide switching between time slots and between wavelengths.

A prior art time and wavelength division multiplexed optical switching system described in Japanese Patent Application No. 58-033069 is made up of a first time switching stage, an intermediate, wavelength switching stage and a second time switching stage, with the successive stages being interconnected by optical links. However, the use of two time switching stages requires a substantial amount of optical switching elements. In addition, the time-wavelength-time switching configuration lacks the ability to implement a multistage configuration having a capacity exceeding beyond the capacity of "n×m" multiplex.

Another prior art system is a time and wavelength division multiplexed system for transmission of a desired program from a central source to subscriber terminals. This involves the use of a substantial amount of optical components such as wavelength selectors and photodiode arrays and electronic components such as time division selectors and electrooptical converters.

SUMMARY OF THE INVENTION

It is therefore an object of the present invention to provide a time and wavelength switch having reduced optical components.

It is another object of the present invention to provide a time and wavelength switch which allows a multistage configuration.

The time and wavelength switch of the present invention comprises a plurality of wavelength selectors for selecting a time division multiplexed (TDM) channel of a first wavelength from a plurality of incoming TDM channels of different wavelengths, and a plurality of time-slot switching and wavelength conversion stages connected respectively to the outputs of the wavelength selectors for deriving a signal of a second time slot and a second wavelength from a first time slot of the selected TDM channel.

Specifically, the time-slot switching and wavelength conversion stages comprise a plurality of time-slot switches connected respectively to the outputs of the wavelength selectors for switching the first time slot of the selected TDM channel to the second time slot, and a plurality of wavelength converters connected respectively to the outputs of the time-slot switches for converting the wavelength of the second time slot to the second wavelength. Alternatively, the time-slot switching and wavelength conversion stages comprise a plurality of wavelength converters connected respectively to the outputs of the wavelength selectors for converting the wavelength of the selected TDM channel to the second wavelength, and a plurality of time-slot switches respectively connected to the outputs of the wavelength convertor means for switching the first time slot of the TDM channel of the second wavelength to the second time slot. In a further alternative embodiment, the time-slot switching and wavelength conversion stages comprise a plurality of sets of wavelength converters each having a hysteretic output level characteristic to maintain optical energy supplied thereto. A plurality of first optical switches are associated respectively with the sets of wavelength converters and have input terminals connected respectively to the outputs of the wavelength selectors, each of the first optical switches having a plurality of output terminals connected respectively to the inputs of the wavelength converters of the associated set for coupling the selected TDM channel to one of the wavelength converters of the associated set to cause it to convert the first wavelength of the selected TDM channel to the second wavelength and maintain the converted second wavelength. A plurality of second optical switches are associated respectively with the sets of wavelength converters, each of the second optical switches having a plurality of inputs connected respectively to the outputs of the wavelength converters of the associated set for extracting a portion of the maintained second wavelength time coincident with the second time slot.

According to a second aspect of the present invention, a time and wavelength division multiplexed optical switching system is provided which comprises a plurality of first time and wavelength (T×W) switches connected to incoming optical highways and a plurality of second T×W switches connected to outgoing optical highways. Each of the first T×W switches comprises a plurality of wavelength selectors for selecting a time division multiplexed (TDM) channel of a first wavelength from a plurality of incoming TDM channels of different wavelengths, and a plurality of time-slot switching and wavelength conversion stages connected respectively to the outputs of the wavelength selectors for deriving a signal of a second time slot and a second wavelength from a first time slot of the selected TDM channel. A plurality of branching couplers are provided having inputs connected respectively to the outputs of the first T×W switches, the input of each of the branching couplers being branched out to a plurality of outputs. A plurality of sets of optical devices are located between the first and second T×W switches. The inputs of the optical devices are connected respectively to the outputs of the branching couplers for selecting one of the second time slot and the second wavelength. A plurality of combining couplers have inputs connected respectively to the outputs of the optical devices to combine signals on the inputs of each combining coupler to an output of each combining coupler. Each of the second T×W switches comprises a plurality of wavelength selectors for selecting the second wavelength, and a plurality of time-slot switching and wavelength conversion stages connected respectively to the outputs of the wavelength selectors for deriving a signal of a third time slot and a third wavelength from the second time slot of the selected second wavelength for application to an associated outgoing highway.

According to a further aspect of the invention, there is provided a time and wavelength division multiplexed optical switching system which comprises a source for generating a plurality of time division multiplexed (TDM) channels of different wavelengths, a coupler connected to the source for coupling the TDM channels to a plurality of outputs. A plurality of wavelength selectors are connected respectively to the outputs of the coupler for selecting one of the TDM channels in response to a wavelength selection command signal applied thereto. A plurality of optical gates are also connected respectively to the outputs of the wavelength selector means for selecting a time slot of the selected TDM channel in response to a time slot selection signal applied thereto. A plurality of subscriber terminals are respectively associated with the optical gates, each of the terminals having an optoelectrical converter coupled through an optical transmission medium to the output of the associated optical gate.

BRIEF DESCRIPTION OF THE DRAWINGS

The present invention will be described in further detail with reference to the accompanying drawings, in which:

FIGS. 4A and 4B are block diagrams illustrating alternative modifications of the embodiment of FIG. 3;

FIG. 5 is an illustration useful for describing the operation of the time and wavelength switch of FIG. 3;

DETAILED DESCRIPTION

Figure 1A:
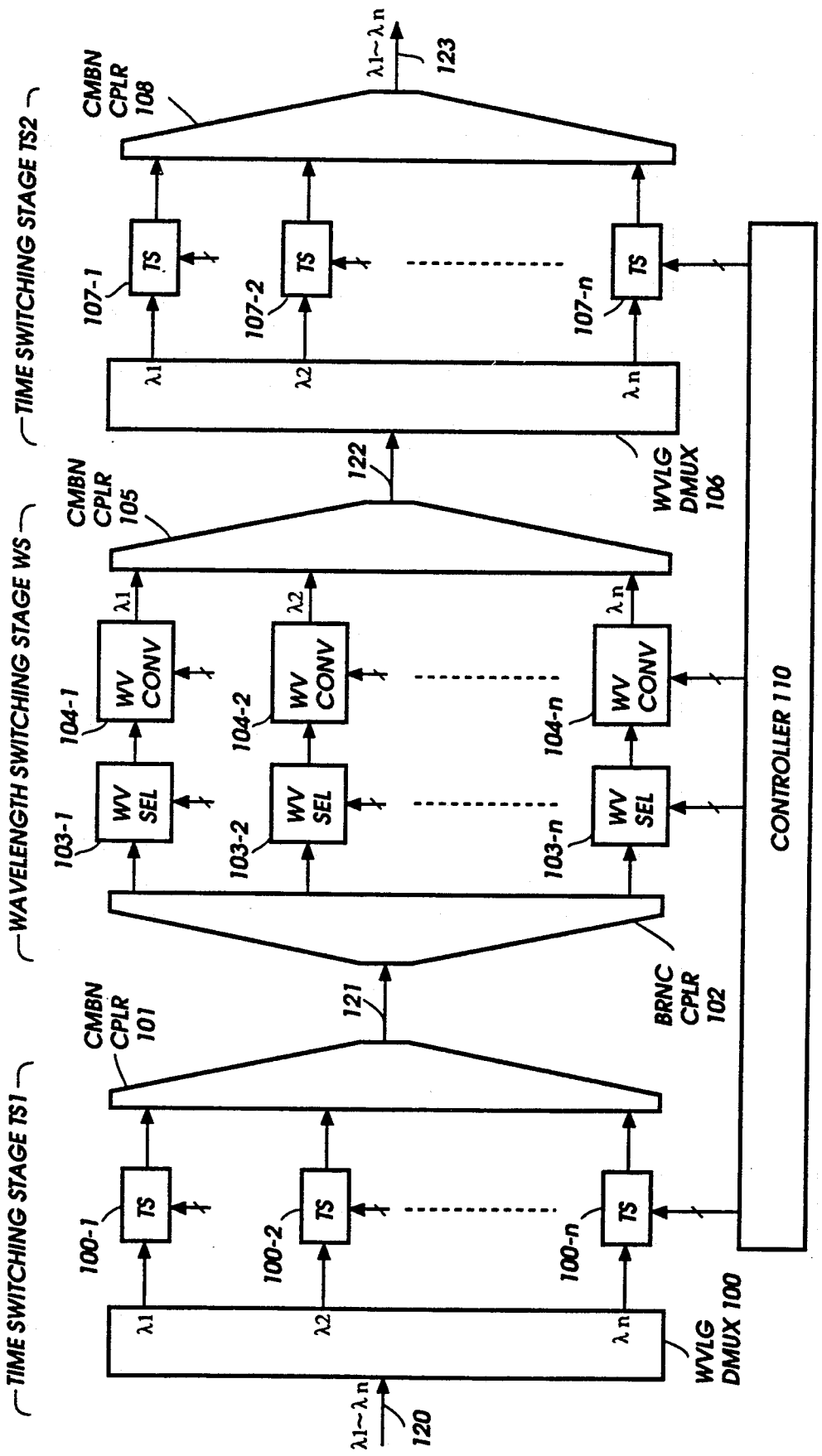
FIG. 1A is a block diagram of a prior art time and wavelength division multiplexed switching system.
Figure 1B:
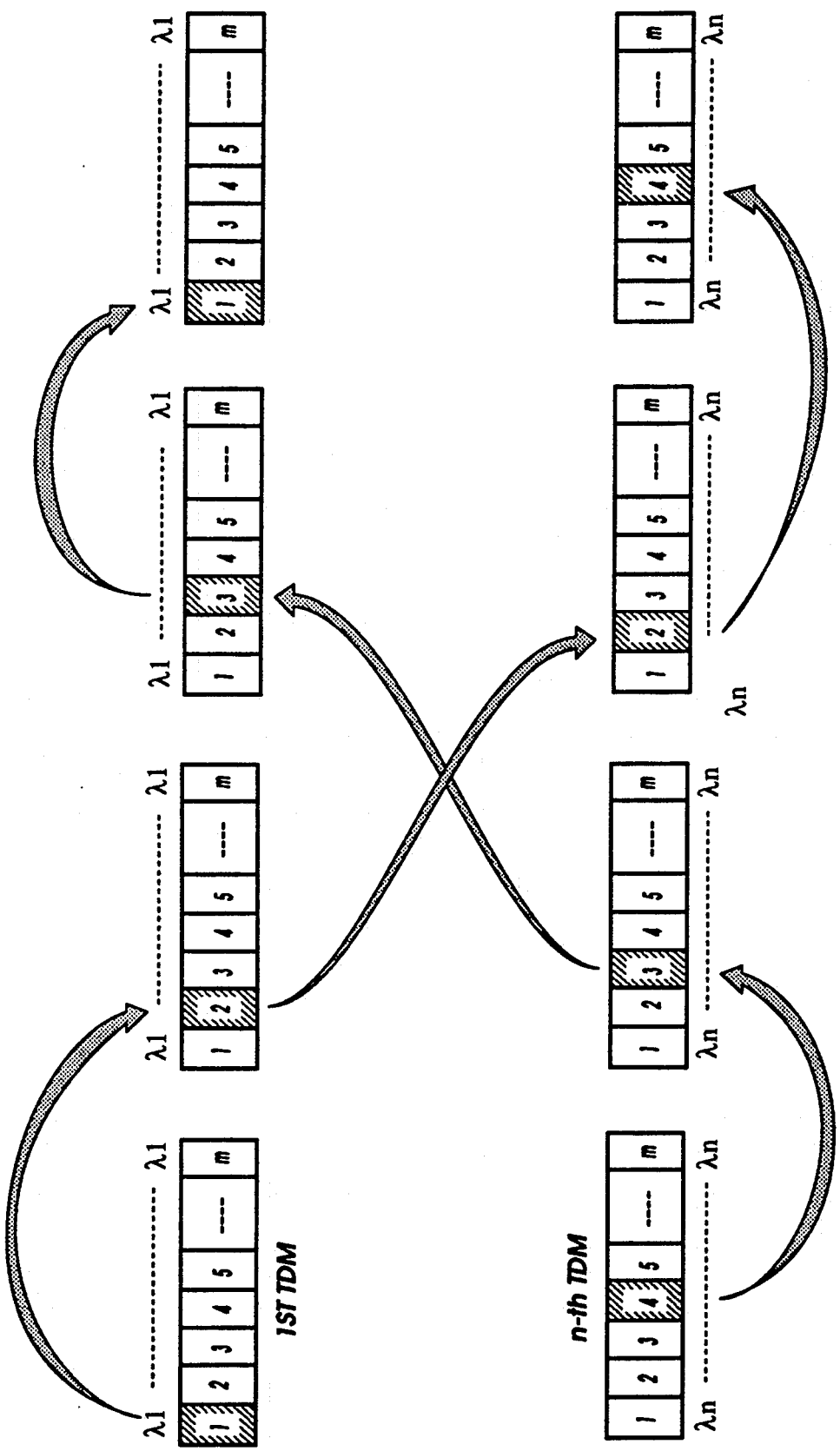
FIG. 1B is an illustration for describing the operation of the prior art system.

Before going into the details of the present invention it is appropriate to describe a prior art time and wavelength division multiplexed optical switching system described in Japanese Patent Application No. 58-033069 with reference to FIGS. 1A and 1B. In FIG. 1A, the prior art system comprises a first time switching stage TS1, a wavelength switching stage WS and a second time switching stage TS2, which may be located in different locations and connected by intermediate optical highways 121 and 122. Time slots #1 through #m are multiplexed on wavelengths $\lambda 1$ to $\lambda n$ to form time division multiplexed (TDM) optical channels which are wavelength multiplexed into a single TWDM (time and wavelength multiplexed) channel which is supplied through an incoming optical highway 120 to a wavelength demultiplexer 100 of a time switching stage where the incoming TDM channels are demultiplexed, or separated into individual wavelength components $\lambda_1$ through $\lambda_n$ and fed to time switches 100-1 through 100-n, respectively, to provide time slot switching to a different one of the time slots $t_1$ through $t_m$ in response to a time switching control signal supplied from a controller 110. The time-switched outputs from the time switches 100-1 to 100-n are combined by an optical combining coupler 101 onto a highway 121 and supplied to a branching coupler 102 of a wavelength switching stage where the time and wavelength division multiplexed signals having wavelengths $\lambda_1$ through $\lambda_n$ are branched out into identical optical signals and fed into wavelength selectors 103-1 through 103-n, respectively. One of the wavelength selectors 103 is selected by and supplied with a wavelength switching signal from the controller 110 to select one of the wavelengths $\lambda_1$ through $\lambda_n$. The outputs of wavelength selectors 103-1 to 103-n are supplied respectively to wavelength converters 104-1 to 104-n where the selected wavelength is switched to a different one of the wavelengths $\lambda_1$ through $\lambda_n$ in response to a wavelength switching control signal from the controller 110. The outputs of the wavelength converters 104 are multiplexed by a combining coupler 105 onto a highway 122 which leads to a wavelength demultiplexer 106 of a second time switching stage where the lightwaves are demultiplexed into individual wavelength components and fed to time switches 107-1 and 107-n, respectively, in which time switching takes place in response to a control signal from the controller 110. The outputs of the time switches 107 are multiplexed by a combining coupler 108 onto an outgoing highway 123.

As shown in FIG. 1B, if channel #1 of a first TDM (time division multiplexed) channel of wavelength $\lambda 1$ is connected to channel #4 of the n-th WDM channel of wavelength $\lambda n$, the controller 110 may find a time slot #2, for example, and operates the time switch 100-1 of the first time stage by switching the time slot #1 to #2 of wavelength $\lambda 1$ and operates the wavelength selector 103-n and wavelength converter 104-n of the wavelength stage by selecting the wavelength $\lambda 1$ output of time switch 100-1 and converting its wavelength to $\lambda n$. The controller further operates the time switch 107-n of the second time stage by causing it to switch the time slot #2 to #4. For full-duplex operation, a return connection is required and realized by transferring information from the time slot #4 of the n-th TDM channel to time slot #3, for example, and switching the wavelength $\lambda n$ to the wavelength $\lambda 1$ of the first TDM channel. One disadvantage of the prior art is that a substantial number of optical components are required. In particular, the use of two time switching stages requires a substantial amount of optical switching elements and the separate location of such time and wavelength switching stages need additional optical components for combining outputs of one stage into a single highway signal for application to the next stage and branching it out into individual components on entering it. Another disadvantage resides in the fact that the time-wavelength-time switching configuration lacks the ability to implement a multistage configuration having a capacity exceeding beyond the capacity of "n×m" multiplex.

Figure 2:
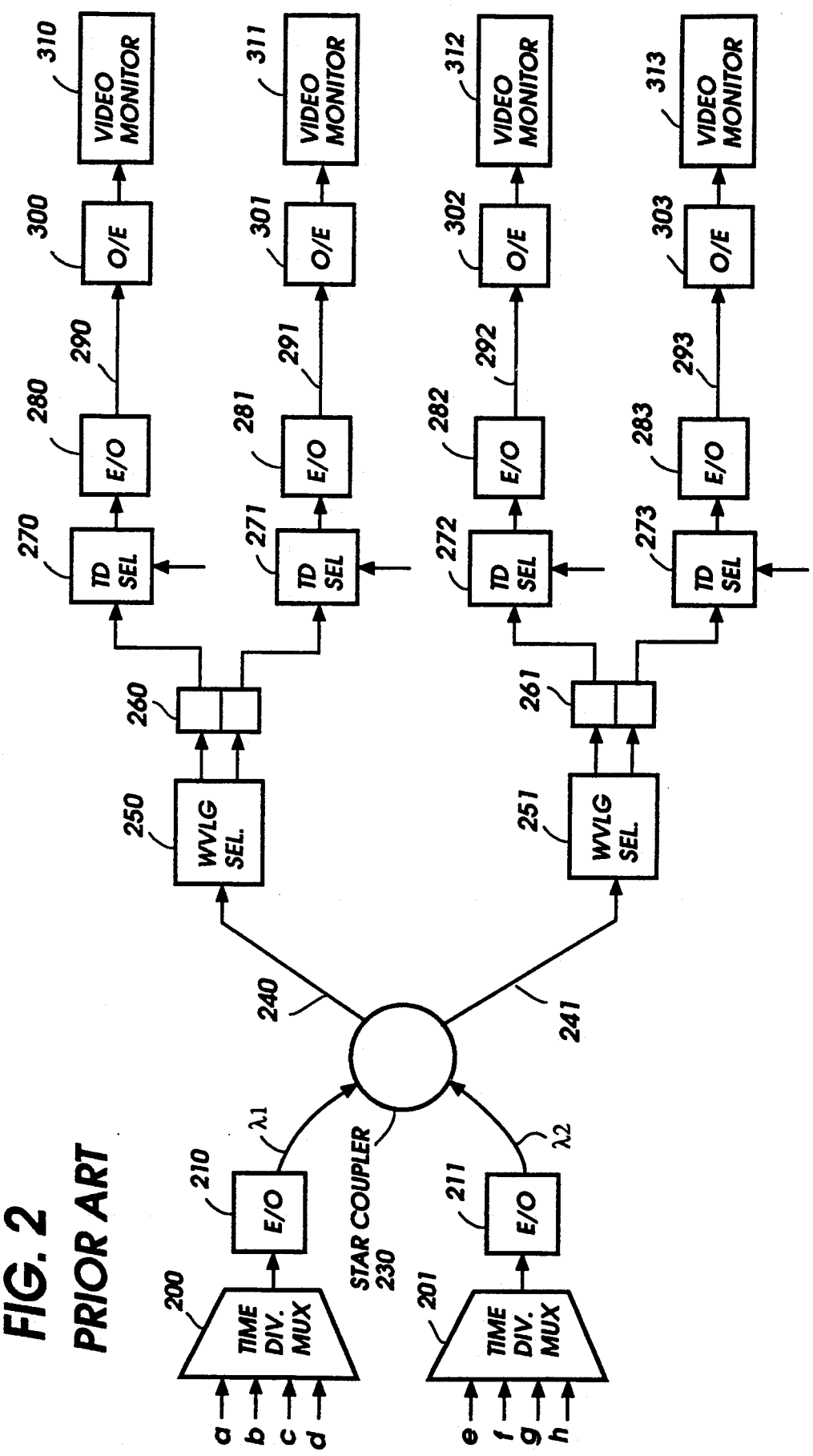
FIG. 2 is a block diagram of a prior art time and wavelength switching system for transmitting a desired video program to subscriber terminals.

FIG. 2 is an illustration of another prior art optical switching system which allows transmission of video signals designated A to H from a central location in response to a command from subscribers. The electrical video signals A to D are multiplexed on four time slots of wavelength λ1 and signals E to H are similarly multiplexed on wavelength λ2 by means of time division multiplexers 200, 201 whose outputs are connected through electrooptical converters 210, 211 to a star coupler 230 where the two optical TDM signals are multiplexed and supplied through optical channels 240 and 241 to wavelength selectors 250 and 25b, respectively. Each of the wavelength selectors 250, 25b is responsive to a switching control signal supplied from a subscriber to select one of the multiplexed wavelengths. The outputs of the wavelength selectors 250 and 25b are converted into electrical signals by photodiode arrays 260, 261 and supplied to time division selectors 270, 271, 272, 273, each of which is controlled by the switching signal from a subscriber to select one of the time slots of the selected wavelength. The outputs of the time division selectors 270 to 273 are converted by electrooptical converters 280 through 283 to optical signals and transmitted through subscriber lines 290, 291, 292, 293 to optoelectrical converters 300, 301, 302, 303 and fed to video monitors 310 through 313, respectively. In this way, remote subscribers are capable of selecting a desired video program supplied from the central location.

One disadvantage of this optical switching system is that it requires a substantial amount of optical components such as wavelength selectors and photodiode arrays and electronic components such as time division selectors and electrooptical converters. Another disadvantage is that if more than one video monitor is connected to a common subscriber line, the prior art system is incapable of distributing different video programs to respective video monitors.

Figure 3:
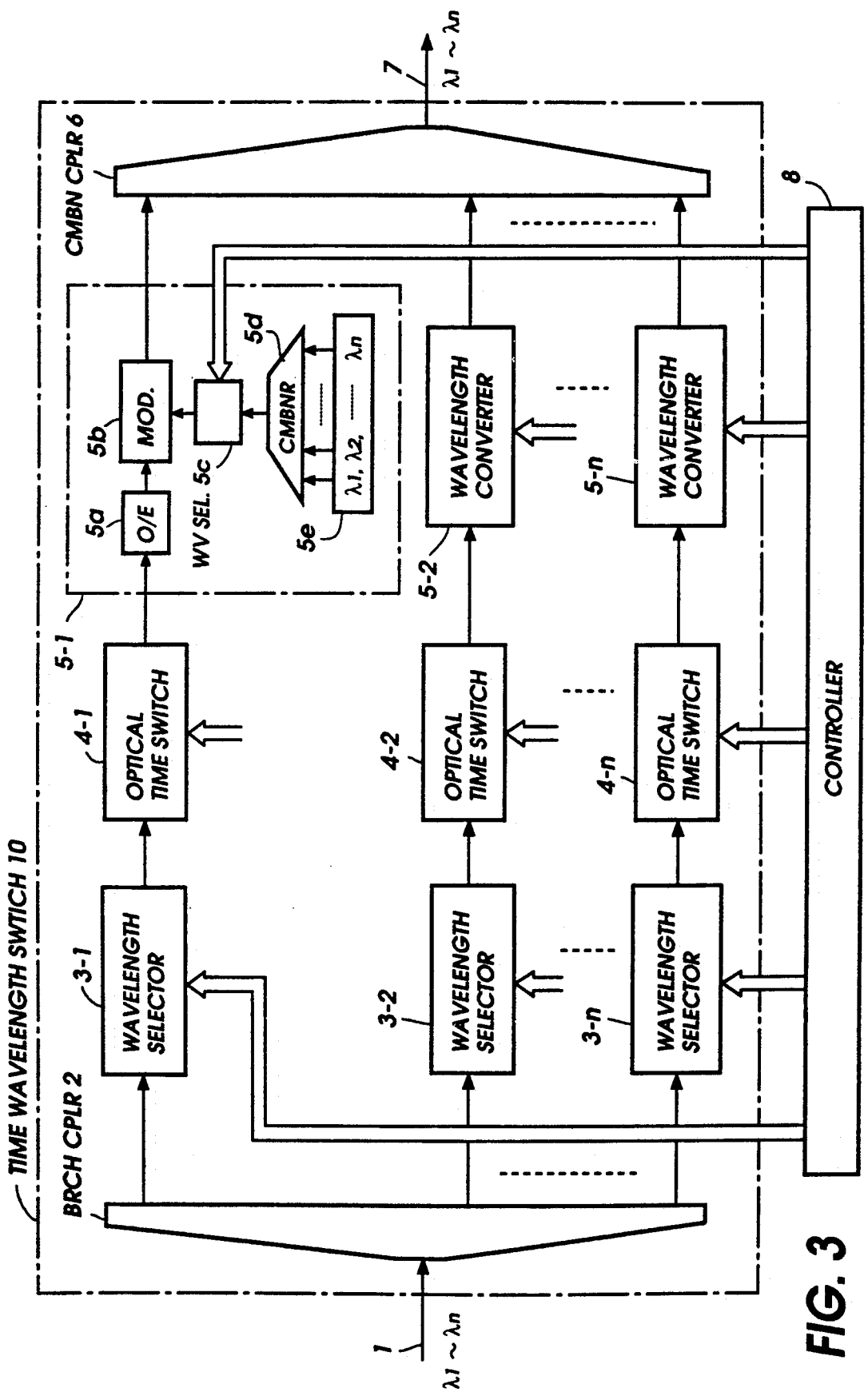
FIG. 3 is a block diagram of a time and wavelength switch according to a first embodiment of the present invention.

Referring now to FIG. 3, there is shown a time and wavelength switching unit 10 according to a first embodiment of the present invention which is less in the amount of optical components and can be used as a basic building block of a multistage optical switching system. As shown, the time and wavelength switching unit 10 comprises an 1×n optical branching coupler 2 for branching an incoming TWDM optical highway into N branches which are coupled to inputs of wavelength selectors 3-1 through 3-n of any known laser diode capable of wavelength selection. One example of such laser diodes is described in an article "Wavelength Selection With Nanosecond Switching Times Using Distributed-Feedback Laser Amplifiers", pages 969–971, Electronics Letters 21st Jul. 1988, Vol. 24, No. 15. The incoming TWDM signal has n TDM channels of wavelengths λ1 through λn each multiplexing m time slots. Each of these wavelength selectors receive a wavelength selection signal from a controller 8 to select one of the n TDM channels and supplies it to an associated one of a plurality of optical time switches 4-1 through 4-n. Time switching control signals are supplied from the controller 8 to the time switches 4-1 to 4-n. The outputs of the time switches 4 are connected respectively to wavelength converters 5-1 through 5-n. Each of the wavelength converters 5 comprises an optoelectrical converter 5a for converting the output of the associated optical time switch 4. The electrical output of the converter 5a is applied as a modulating signal to a light modulator 5b to which an optical carrier of desired wavelength is injected. To generate the desired wavelength carrier, an array of light sources 5e generate light beams of wavelengths λ1 through λn which are conducted to an optical n×1 combining coupler 5d where the beams are multiplexed and fed to a wavelength selector 5c. A wavelength selection signal is supplied from the controller 8 to the wavelength selector 5c to permit it to select one of the optical carriers and inject the selected carrier to the light modulator 5b, where it is modulated in accordance with the modulating electrical signal, so that the wavelength selected by a wavelength selector 3 is switched to a desired wavelength. The output of the light modulator 5b is coupled as a time-and-wavelength switched TDM channel to an n×1 combining coupler 6 where it is multiplexed with other optical TDM channels into a single TWDM channel appearing on an outgoing optical highway 7. Thus, the optical time switches are needed as much as one half of the prior art. All the components of the unit 10 are housed in a single package to lend itself to adaptation to a wide variety of multistage network configurations in a manner as will be described later.

Alternatively, the optoelectrical converter 5a of each wavelength converter 5 can be connected to the output of the associated wavelength selector 3 as illustrated in FIG. 4A and an electronic time switch 4' is used to replace the optical time switch 4. In a further alternative embodiment, the wavelength converter 5 of FIG. 4A can be replaced with a variable wavelength laser 5' as shown in FIG. 4B.

The operation of the time and wavelength switching unit 10 will be visualized with reference to FIG. 5. In an exemplary connection, time slot #2 of TDM channel of wavelength λ1 is connected to time slot #4 of TDM channel of wavelength λn. The λ1-TDM channel is first selected by the wavelength selector 3-1 and the information arriving in time slot #2 of the selected TDM channel is transferred to the time slot #4, for example, of the same TDM channel by the time switch 4-1. Wavelength converter 5-2 is then operated by the controller 8 to convert the wavelength of the time-slot interchanged λ1-TDM channel to wavelength λn. For full-duplex operation, the λn-TDM channel is selected by wavelength selector 3-n and the information arriving in time slot #4 of the selected TDM channel is transferred to the time slot #2, for example, of the same TDM channel by the time switch 4-n. Wavelength converter 5-n is then operated by the controller 8 to switch the wavelength of the time-switched λn-TDM channel to wavelength λ1.

Figure 6:
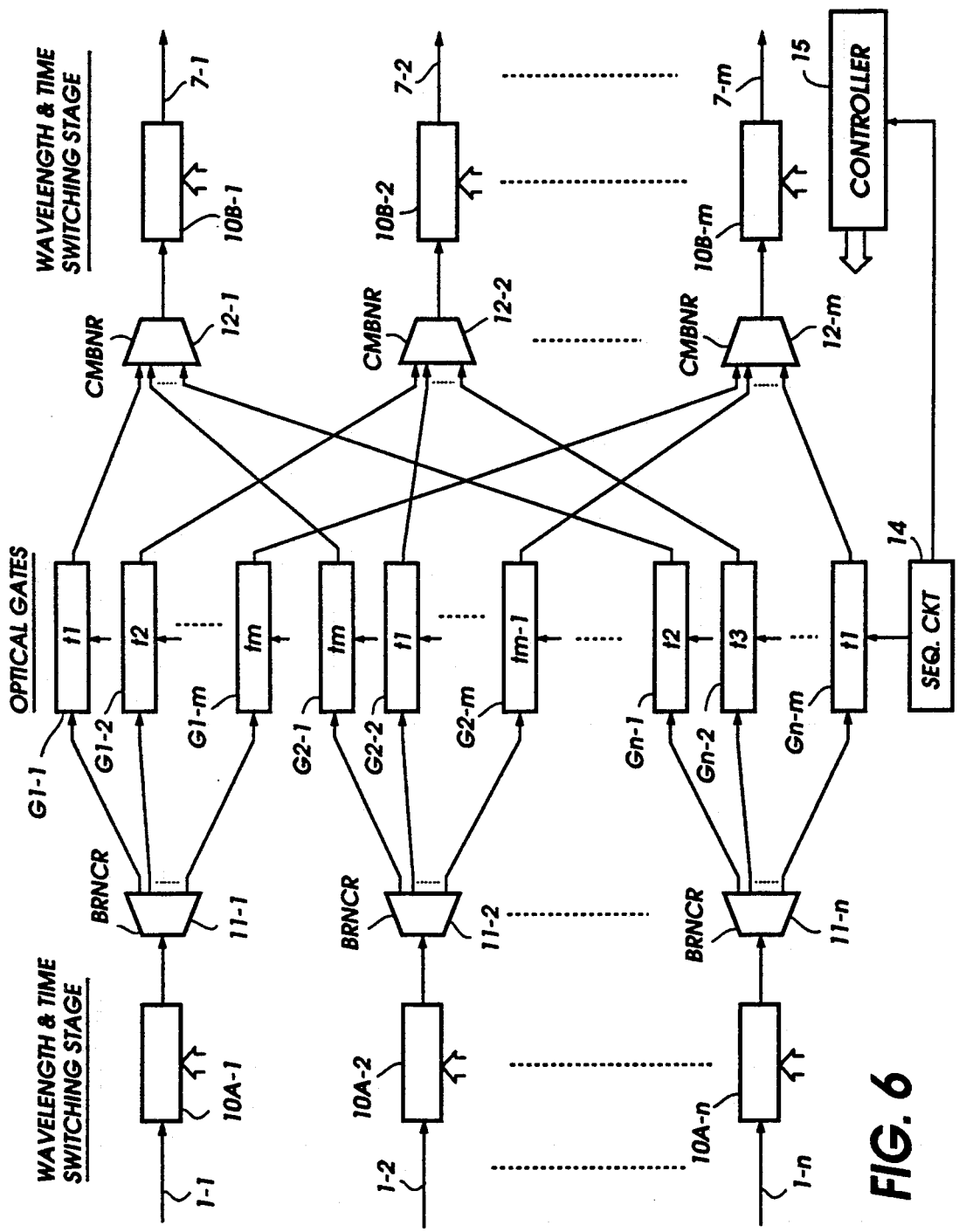
FIG. 6 is a block diagram of a multistage arrangement of a time and wavelength division multiplexed optical switching system according to the present invention.

The time and wavelength (T×W) switch 10 of FIG. 3 can be arranged as incoming and outgoing stages of a multistage time and wavelength division multiplexed switching system as shown in FIG. 6. The incoming stage comprises n T×W switches 10A-1 through 10A-n connected respectively to the inputs of 1×m branching couplers 11-1 through 11-n and the outgoing stage comprises n T×W switches 10B-1 through 10B-m connected respectively from the outputs of m×1 combining couplers 12-1 through 12-n. Between the outputs and inputs of couplers 11 and 12 is an array of optical gates G1 arranged as n groups of m gates each. The inputs of optical gates G1 of each group are connected to the outputs of the associated branching couplers 11. The outputs of optical gates G1-1 through G1-m of the first group are connected to the first inputs of the combining couplers 12-1 through 12-n, respectively. Likewise, the outputs of optical gates G1-2 through G2-m of the second group are connected to the second inputs of the combing couplers 12-1 through 12-m, respectively, and those of optical gates of the n-th group are connected respectively to the n-th inputs of the combining couplers 12-1 through 12-m. In this way, any of the incoming highways 1-1 through 1-n has access to any of the outgoing highways 7-1 to 7-m. All the optical gates are supplied with slot-timing pulses from a sequential circuit 14 so that gates G1-1 through G1-m are timed to respectively pass the information arriving in time slots t1 through tm to the first inputs of the combining couplers 12-1 to 12-m, and those of the second group are timed to open to respectively pass the information of time slots tm, t1, ... tm-1 to the second inputs of the couplers 12. Likewise, the optical gates Gn-1 through Gn-m are timed to respectively pass the information on time slots t2, t3 ... t1 to the n-th inputs of the couplers 12. It is seen therefore that any of the time slots which are supplied to a given one of the combining couplers 12 is not time coincident with any other time slots supplied to the same combining coupler. To perform the time and wavelength switching, T×W switches 10 of both incoming and outgoing stages are supplied with control signals from controller 15.

Figure 7:
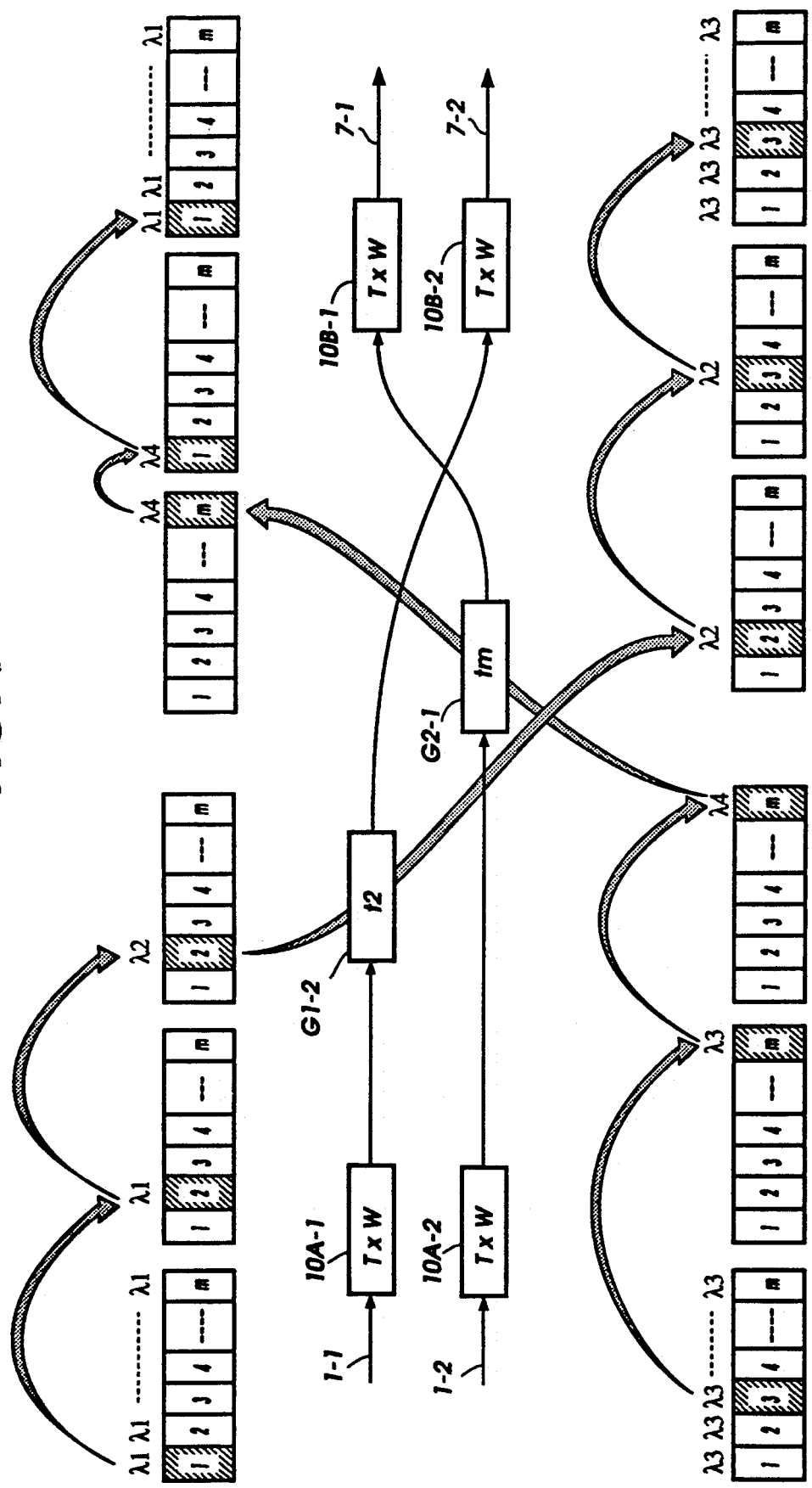
FIG. 7 is an illustration useful for describing the operation of the optical switching system of FIG. 6.

The operation of the multistage arrangement of FIG. 6 will be understood with the following description with reference to FIG. 7. As an example connection, time slot #1 of λ1-TDM channel on incoming highway 1-1 is connected to time slot #3 of λ3-TDM channel on incoming highway 1-2. The forward connection involves T×W switch 10A-1, optical gate G1-2 and T×W switch 10B-2 and the return connection involves T×W switch 10A-2, optical gate G2-1 and T×W switch 10B-1. Controller 15 determines time slot #2 as an available channel between highways 1-1 and 7-2 uniquely from the source and destination time slots in order to control the T×W switch 10A-1. Controller 15 further determines the wavelength λ2, for example, as a wavelength to be switched to by the T×W switch 10A-1. The T×W switch 10A-1 transfers information arriving in time slot #1 of λ1-TDM channel to time slot #2 of the same channel and then switches the wavelength of the time slot #2 of that channel to wavelength λ2 determined by the controller 15. Thus, each of the optical gates G1 to Gn is capable of simultaneously carrying the information of n time slots. The information on time slot #2 of wavelength λ2 is transferred through gate G1-2 to the T×W switch 10B-2 where it is selected and transferred to time slot #3 and then switched to wavelength λ3. To establish a return connection, the controller 15 determines time slot #m as a link between the incoming highway 1-2 uniquely from the source and destination time slots on the outgoing highway 7-1 in order to control the T×W switch 10A-2 and determines the wavelength λ4, for example, as a wavelength to be switched to by the T×W switch 10A-2. The T×W switch 10A-2 transfers information arriving in time slot #3 of λ3-TDM channel on highway 1-2 to time slot #m of the same channel and then switches the wavelength of the time slot #m of that channel to wavelength λ4 determined by the controller 15 for the return connection. The information on time slot #m of wavelength λ4 is transferred through gate G2-1 to the T×W switch 10B-1 where it is selected and transferred to time slot #1 and then switched to wavelength λ1.

Figure 8:
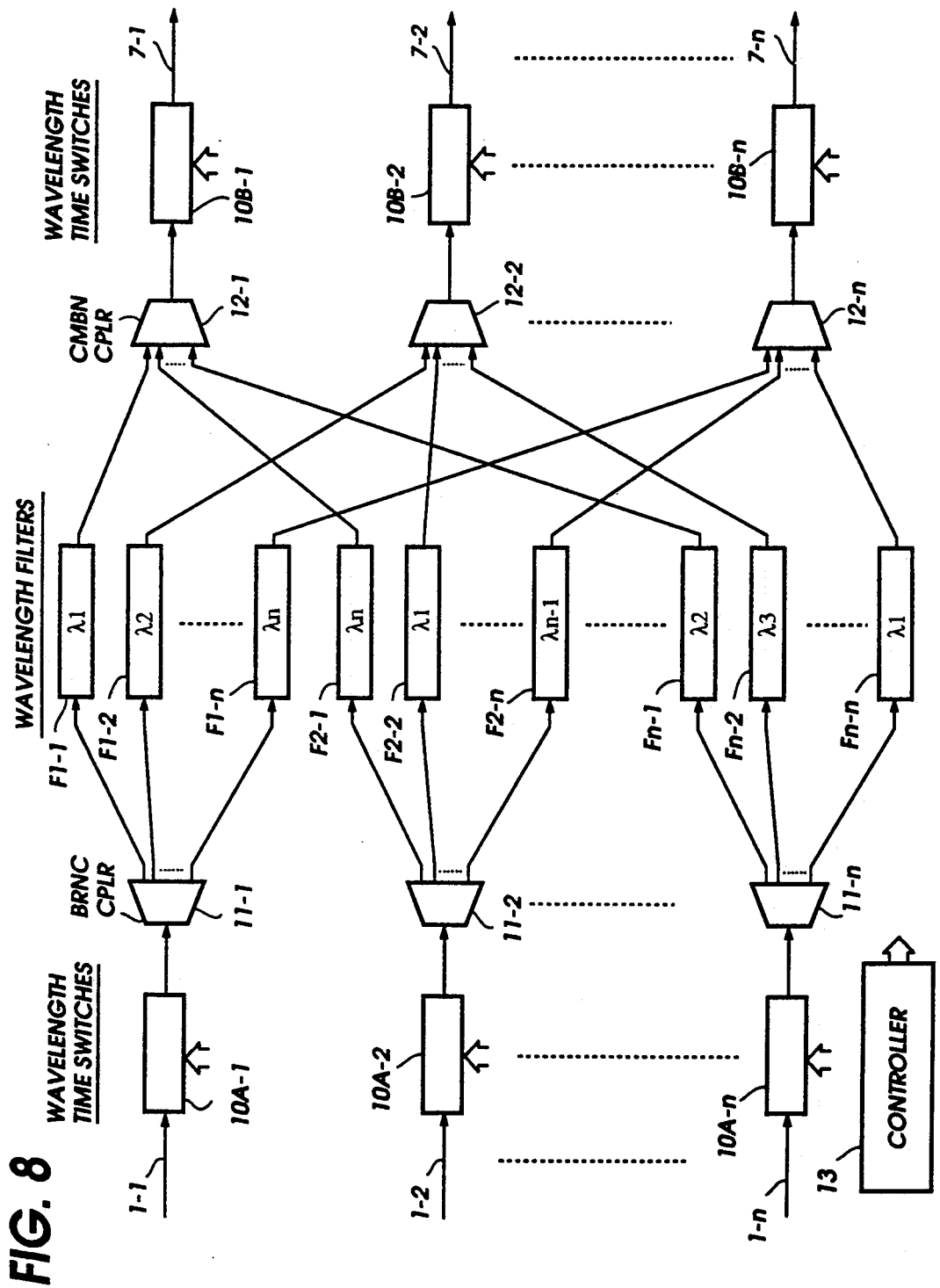
FIG. 8 is a block diagram of a modified form of the multistage arrangement of a time and wavelength division multiplexed optical switching system according to the present invention.

A modified embodiment of the multistage arrangement of FIG. 6 is shown in FIG. 8. This embodiment differs from the FIG. 6 embodiment in that wavelength filters F1 through Fn are used instead of the optical gates G1 to Gn. There are n groups of n wavelength filters each. In a manner similar to the previous embodiment, wavelength filters F1-1 to F1-n have their inputs connected respectively to the outputs of branching coupler 11-1 and have their outputs connected to the first inputs of combining couplers 12-1 through 12-n, respectively, to establish a full availability connection between the incoming highway 1-1 to all the outgoing highways 7-1 to 7-n. Full availability connections are also established between the other wavelength filters and their associated couplers. Wavelength filters F1-1 through F1-n are tuned to pass wavelengths λ1, λ2 ... λn, respectively, to their associated inputs of the combining couplers 12, and wavelength filters F1-2 through F2-n are tuned to pass wavelength λn, λ1 ... λn-1, respectively to their associated inputs of the combining couplers 12. Similarly, wavelength filters Fn-1 to Fn-n have wavelengths λ2, λ3, ... λ1, respectively. In this way, the wavelength at any input of any combining coupler 12 differs from the wavelengths of the other inputs of the same combining coupler.

Figure 9:
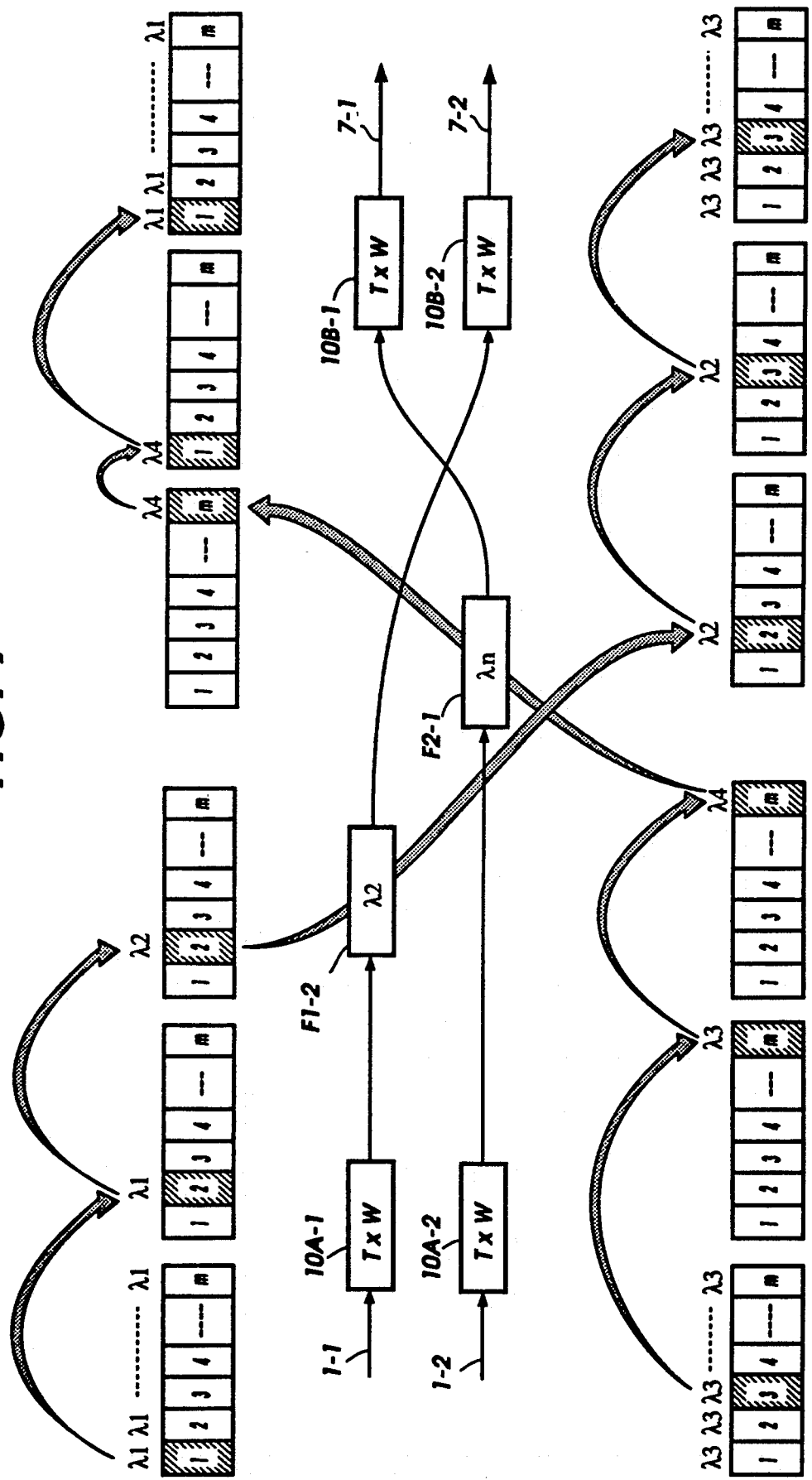
FIG. 9 is an illustration useful for describing the operation of the optical switching system of FIG. 8.

As illustrated in FIG. 9, a forward connection between time slot #1 of λ1-TDM channel on highway 1-1 and time slot #3 of λ3-TDM channel on outgoing highway 7-2 can be established by selecting the wavelength λ2 as a wavelength to be switched to by T×W switch 10A-1 and passed through wavelength filter F1-2 to outgoing highway 7-2 and by determining time slot #2, for example, as one of the available time slots of the selected wavelength. The return connection involves selecting the wavelength λn as a wavelength to be switched to by T×W switch 10A-2 and passed through wavelength filter F2-1 to the outgoing highway 7-1 and determining time slot #m, for example, as one of the available time slots of the selected wavelength.

Figure 10:
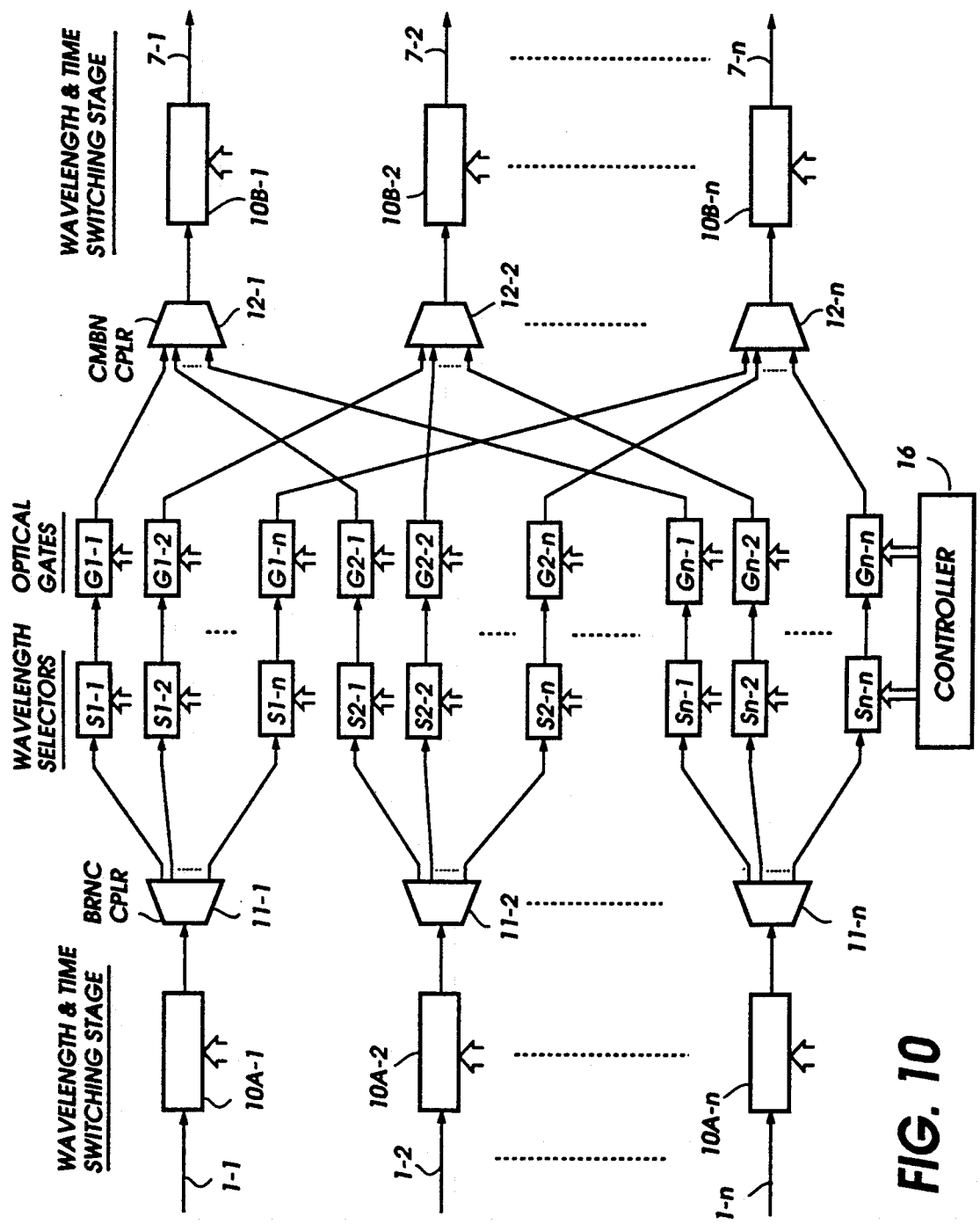
FIG. 10 is a block diagram of a further modification of the multistage arrangement of a time and wavelength division multiplexed optical switching system according to the present invention.

The multistage arrangement of FIG. 6 can be further modified as shown in FIG. 10. In this modification, the array of optical gates G1 through Gn are replaced with an array of wavelength selectors S1 through Sn and an array of optical gates G1 through Gn connected in series to the associated wavelength selectors S1 to Sn. Wavelength selectors S1 to Sn are responsive to a wavelength selecting signal supplied from a controller 16 and optical gates G1 to Gn are responsive to a gating signal from the controller 16 to establish a particular set of wavelength and time slot for each path from the branching couplers 11. In this way, n×n time slots can be established between each of the incoming highways 1 and each of the outgoing highways 7. It is to be noted that optical gates G1-Gn can be dispensed with if the wavelength selections by their associated wavelength selectors S1 to Sn are performed in time coincidence with the time slot to be switched to.

Figure 11:
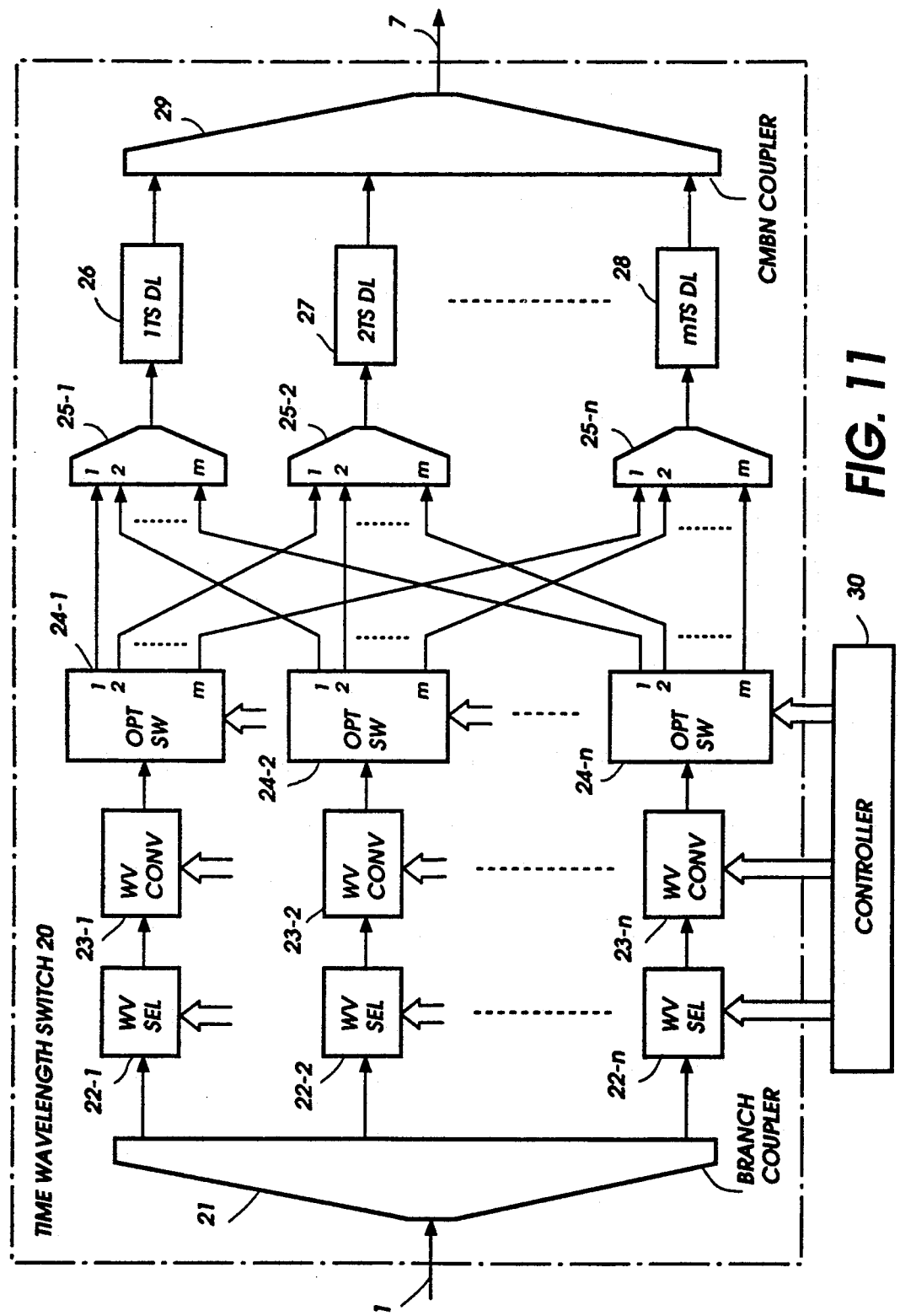
FIG. 11 is a block diagram of a time and wavelength switch according to a second embodiment of the present invention.

A modification of the time wavelength switch 10 of FIG. 3 is shown in FIG. 11. In this modification, the T×W switch 20 comprises a branching coupler 21 for coupling the input n TDM channels to wavelength selectors 22-1 through 22-n which are responsive to wavelength selecting signal from a controller 60 to select one of the TDM channels. The outputs of the wavelength selectors 22-1 through 22-n are respectively connected to wavelength converters 23-1 through 23-n of the type as shown in FIG. 3, which are also responsive to wavelength switching signal from the controller 30 to switch the wavelength of the selected TDM channel to a desired wavelength. The outputs of the wavelength converters 23-1 through 23-n are coupled respectively optical switches, or gates 24-1 through 24-n which are responsive to a time-slot selecting signal from the controller 30 to couple its input from the associated wavelength converter 23 to one of combining couplers 25-1 through 25-m. The first to the m-th outputs of the optical switch 24-1 are connected respectively to the first inputs of combining couplers 25-1 through 25-m. The first to the m-th outputs of the optical switch 24-2 are connected respectively to the second inputs of combining couplers 25-1 through 25-m, and those of the optical switch 24-n are connected respectively to the n-th inputs of combining couplers 25-1 through 25-m. The outputs of the combining couplers 25-1 and 25-2 are respectively connected to a one-time-slot optical delay line 26 and a two-time-slot optical delay line 27, and the output of the combining coupler 25-m is connected to an m-time-slot optical delay line 28. The outputs of the delay lines 26 to 28 are coupled to a combining coupler 29 for delivery to the outgoing highway 7. If it is desired to switch time slot #1 of a TDM channel selected by wavelength selector 22-1 to time slot #m, the associated optical switch 24-1 couples the time slot #1 of this TDM channel to the delay line 28 via coupler 25-m. Thus, time slot #1 is thus delayed by m time slots by the delay line 28 and so the information arriving in time slot #1 appears on the outgoing highway 7 in time slot #m.

Figure 12:
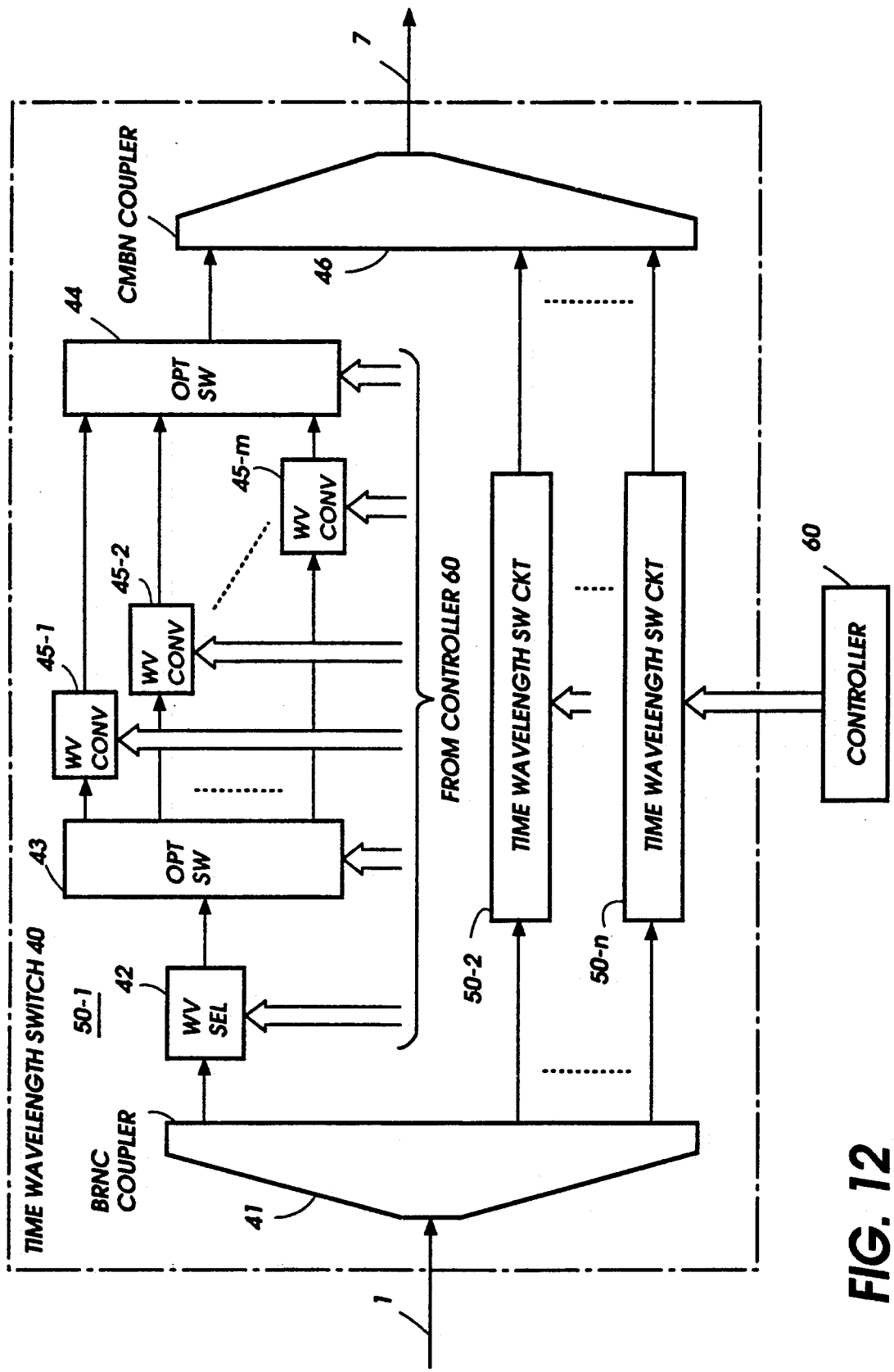
FIG. 12 is a block diagram of a time and wavelength switch according to a third embodiment of the present invention.

Another modification of the T×W switch 10 of FIG. 3 is shown in FIG. 12. The T×W switch designated 40 is made up of n identical time wavelength switching circuits 50-1 through 50-n connected in parallel between the outputs of a branching coupler 41 and the inputs of a combining coupler 46. Each of the time wavelength switching circuits 50 comprises a wavelength selector 42 for selecting a desired TDM channel in response to a signal from a controller 60, a pair of optical switches 43 and 44, and m variable wavelength bistable devices, or bistable wavelength converters 45-1 through 45-m which are connected in parallel between the outputs of optical switch 43 and the inputs of optical switch 44. Each bistable wavelength converter 45 is a wavelength tunable laser diode as described in Electronics Letters, Sept. 4, 1987, Vol. 23, No. 20, pages 1088 to 1089. This embodiment is based on the discovery that such tunable laser diodes can also be operated in a bistable mode because of their hysteretic characteristic. Each bistable wavelength converter 45 responds to a level switching signal and a wavelength selecting signal from the controller 60 by switching its operating state between set and reset conditions and by maintaining a selected wavelength during the set condition. Optical switch 43 responds to a first time-slot selecting signal from the controller 60 by coupling a time slot of a TDM channel output from the associated wavelength selector 42 to a desired one of the bistable wavelength converters 45 and the optical switch 44 responds to a second time-slot selecting signal from the controller 60 by coupling the output of the desired bistable wavelength converter 45 to combining coupler 46 during the period of a time slot to which the time slot of the TDM channel is to be switched. If time slot #1 of λ1-TDM channel is to be switched to time slot #2 of λ3-TDM channel, bistable wavelength converter 45-2 is switched to a set condition in response to the arrival of time slot #1 of λ1-TDM channel from switch 43 and converts its wavelength form λ1 to λ3. The information carried on time slot #1 of wavelength λ3 is maintained and detected by the optical switch 44 during the period of the outgoing time slot, i.e., #2.

Figure 13:
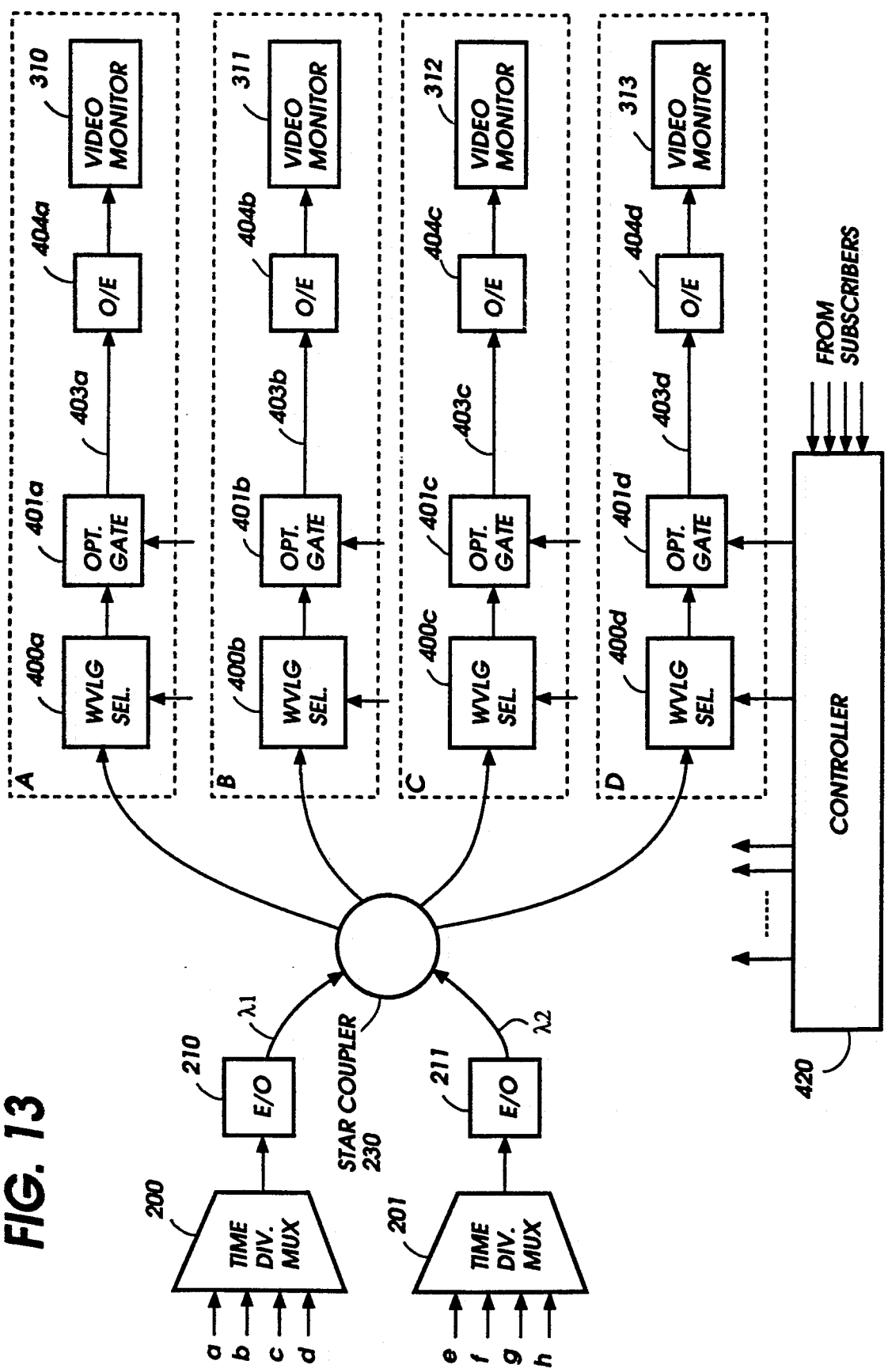
FIG. 13 is a block diagram of a time and wavelength division switching system for transmission of a video program according to the present invention.

Referring to FIG. 13, there is shown another time and wavelength division switching system which is an improvement of the prior art system of FIG. 3. In FIG. 13, parts corresponding to those in FIG. 2 are marked with the same numerals as used in FIG. 2. The system comprises a plurality of channel systems A, B, C and D coupled between the star coupler 230 and the associated subscriber lines 290, 291, 292 and 293. Each of the channel systems comprises a wavelength selector 400 and an optical switch 401. Controller 420 supplies wavelength and time switching signals to the control terminals of the wavelength selector 400 and optical gate 401 of each channel system in response to a command signal from the subscribers. Each wavelength selector 400 is connected from the star coupler 230 to select a desired TDM channel from a plurality of TDM channels of different wavelengths in response to a selection command signal from the associated subscriber which is coupled via the controller 420 and feeds the associated optical gate 401. Information carried on a desired time slot of the selected TDM channel is selected by the optical gate 401 in response to the selection command signal from the subscriber. The selected time slot of the desired TDM channel is supplied from the optical gate 401 through an optical transmission medium 403 to an optoelectrical converter 404 located in the subscriber premises, the output of the converter 404 being connected to the associated video monitor 310. To achieve the wavelength selection, each of the wavelength selectors 400 is preferably a distributed-feedback laser amplifier which is capable of wavelength selection with nanosecond switching times. Such laser amplifiers are described in an article "Wavelength Selection with Nanosecond Switching Times Using Distributed-feedback Laser Amplifiers", Electronics Letters, 21st Jul. 1988, Vol. 24, No. 15. Since the wavelength selection is achieved without the need to perform optoelectrical conversion before the time slot selection is achieved, the system can be implemented with reduced optical and electronic components.

Figure 14:
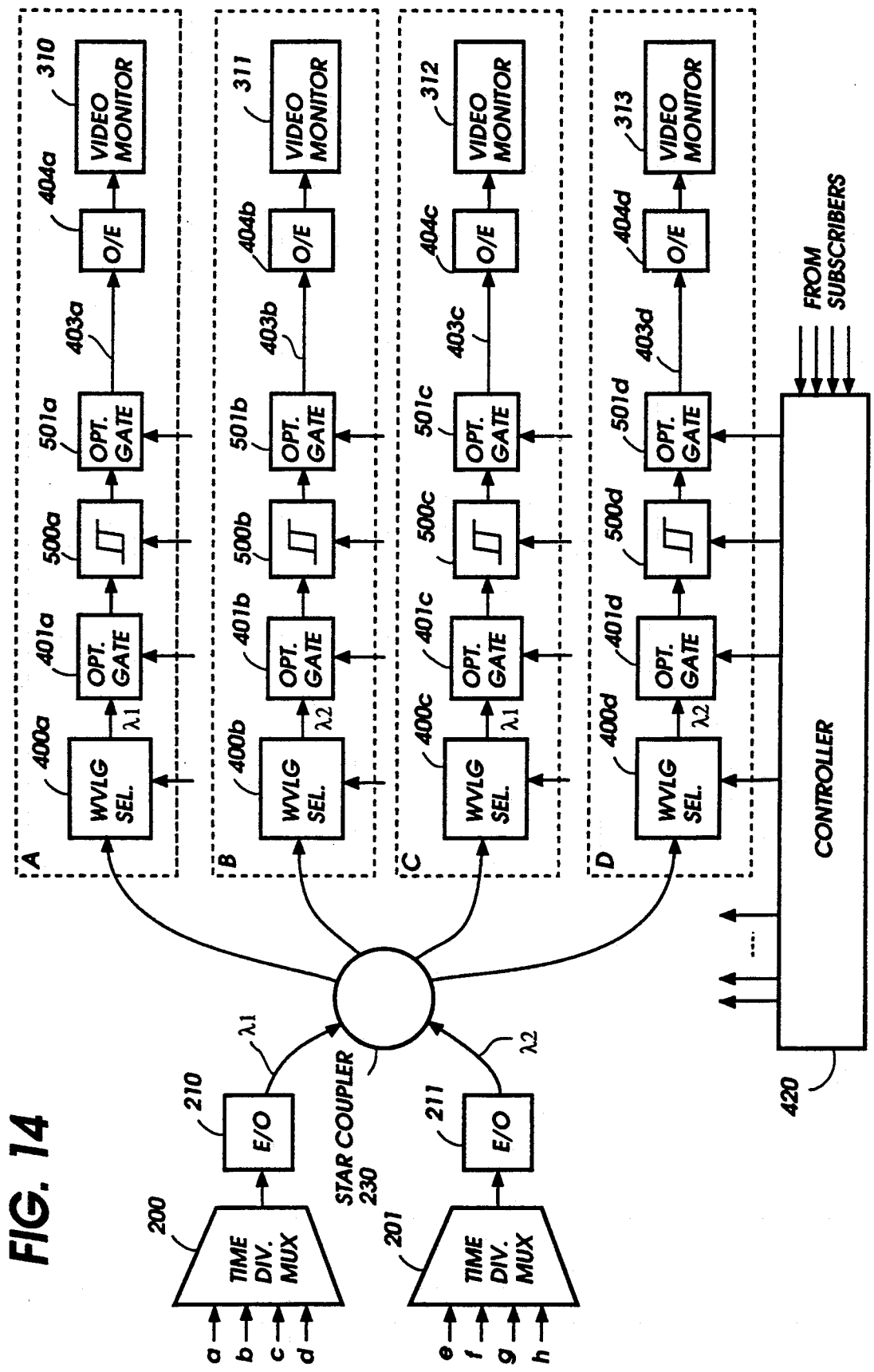
FIG. 14 is a block diagram of a modified form of the time and wavelength division switching system of FIG. 13.
Figure 17A:
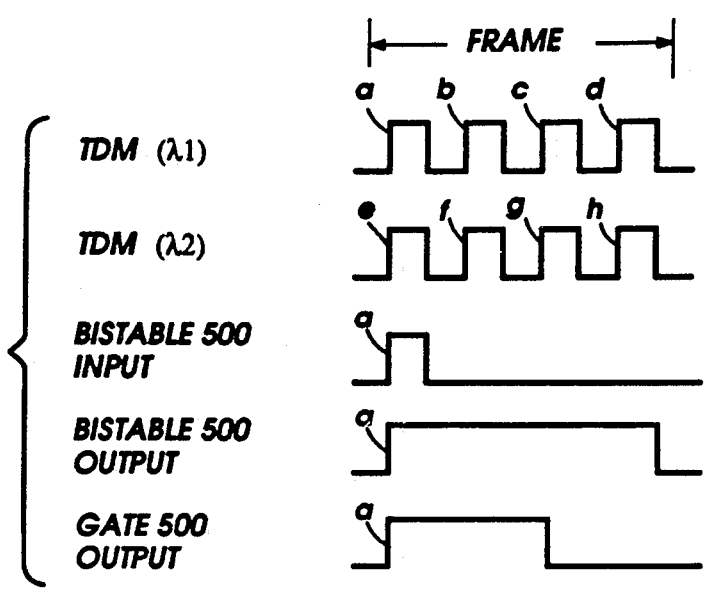
FIGS. 17A, 17B and 17C are timing diagrams associated respectively with the embodiments of FIGS. 14, 15 and 16.

A modification of the embodiment of FIG. 13 is shown in FIG. 14. This modification differs from the FIG. 13 embodiment by the inclusion of optical bistable devices 500 having a hysteretic property as previously described and optical gates 501 connected respectively to the outputs of the optical bistable devices 500. Each of the bistable devices 500 is connected to the output of the associated optical gate 401 to maintain the information on the time slot selected by gate 401 for a period longer than a time slot (see FIG. 17A). This period is determined by a control signal supplied from the controller 420. A portion of the output of each optical bistable device 500 is extracted by the associated optical gate 501 in response to a gating pulse having a duration longer than the duration of a time slot. This gating signal is also supplied from the controller 420 in response to the time slot selection command from the subscriber. Because of the longer-than-time slot length of the signal entering the optical transmission mediums 403, the average amount of light beams entering the optoelectrical converters 404 can be increased. Furthermore, the optical gates 401 can be dispensed with by applying the wavelength selection signal in the form of a pulse time coincident with the time slot to which the incoming signal is to be switched.

Figure 15:
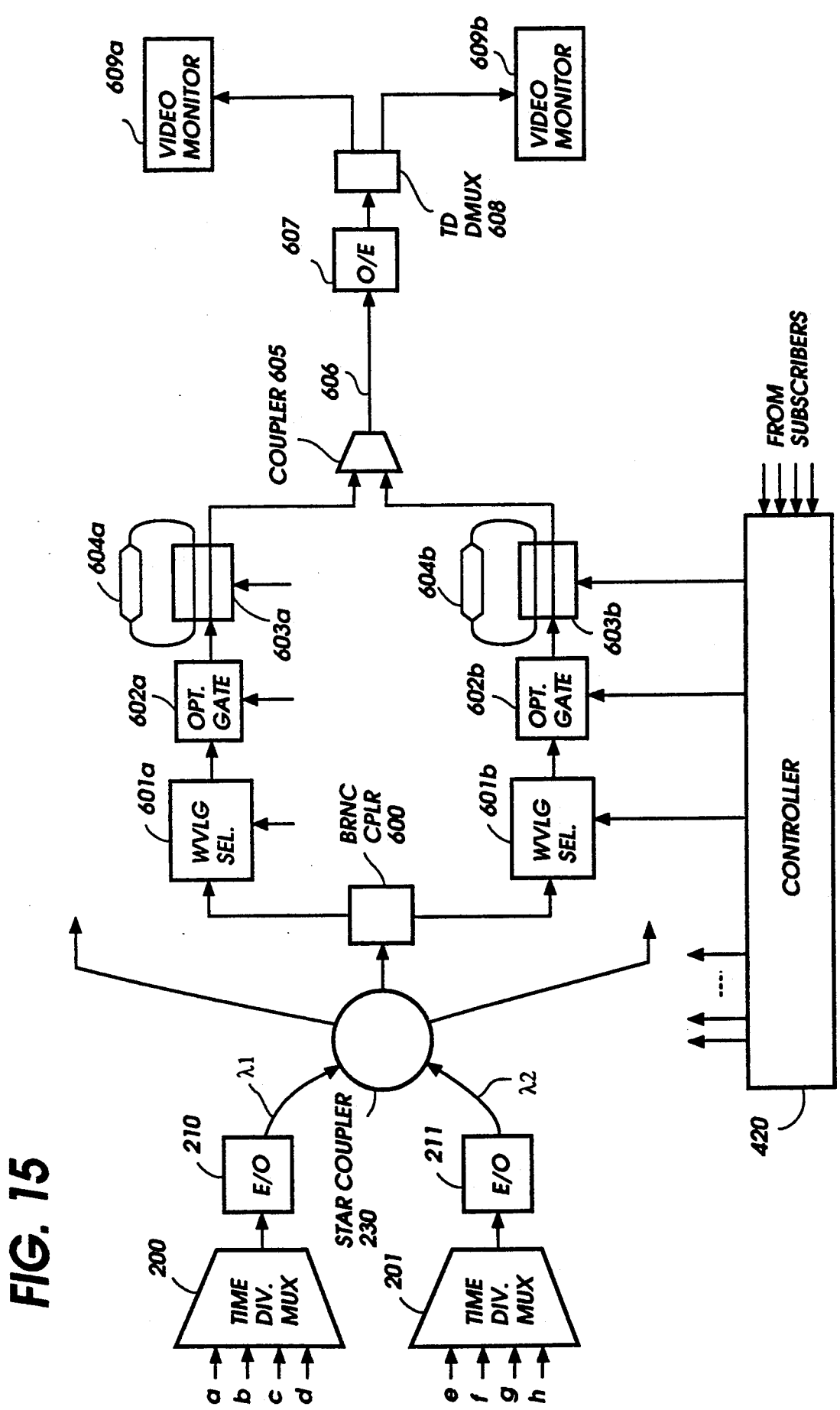
FIG. 15 is a block diagram of a further modification of the time and wavelength division switching system of FIG. 13.
Figure 17B:
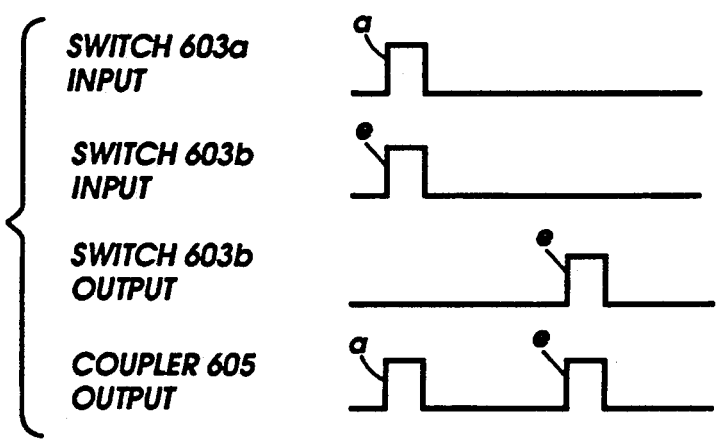

The embodiment shown in FIG. 15 is a further modification of the FIG. 13 which allows a subscriber to receive multiple video signals. As shown, a 1×2 branching coupler 600 is connected to the star coupler 230 to couple the incoming TDM video channels to wavelength selectors 601a, 601b whose outputs are connected respectively to optical gates 602a, 602b. As in the embodiments of FIGS. 13 and 14, wavelength selectors 601 respond to wavelength selection pulses from the controller 420 to select desired wavelength channels. Optical gates 602a, 602b are responsive to time slot selection pulses from controller 420 to select desired time slots respectively from the selected wavelength channels. The outputs of the optical gates 602a, 602b are coupled respectively to optical switches 603a, 603b which selectively apply their respective inputs to terminals A and B of a combining coupler 605 without delay or by way of optical delay lines 604a, 604b depending on delay control signals supplied from the subscriber by way of the controller 420. Each of the optical delay lines 604 introduces an integral multiple of a time slot interval to the incoming signal. The output of combining coupler 605 is coupled by an optical subscriber line 606 to an optoelectrical converter 607. The electrical output of the converter 607 is supplied to a time division demultiplexer 608. The delay control signals are supplied to the switches 603a and 603b such that their outputs are separated appropriately from each other and passed through the combining coupler 605 as TDM signals a and e in FIG. 17B to the transmit end of the optical transmission line 606. At the receiving end, the time division demultiplexer 608 demultiplexes the received signals into individual components for application to video monitors 609a and 609b, respectively.

Figure 16:
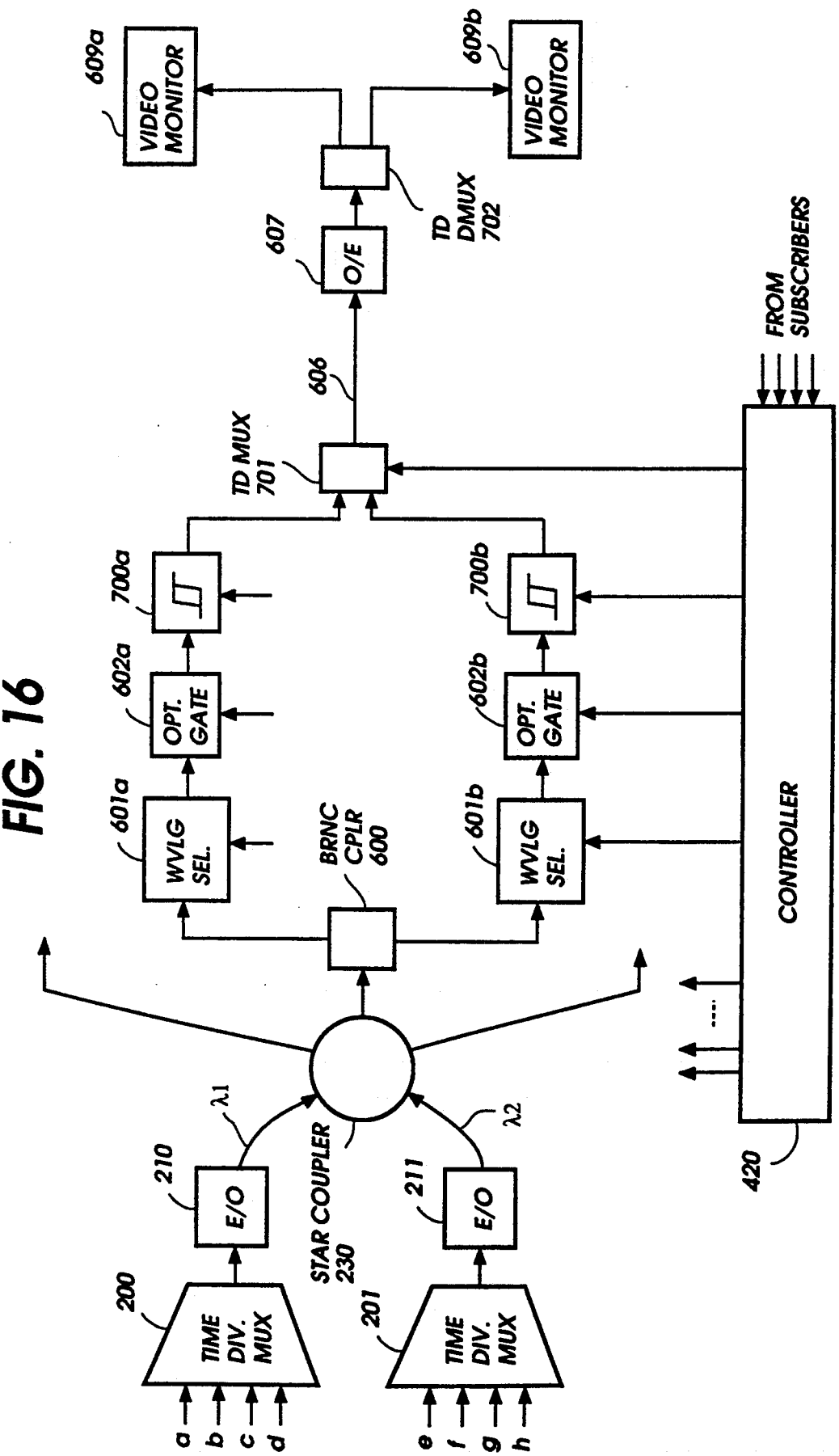
FIG. 16 is a block diagram of a still further modification of the switching system of FIG. 13.
Figure 17C:
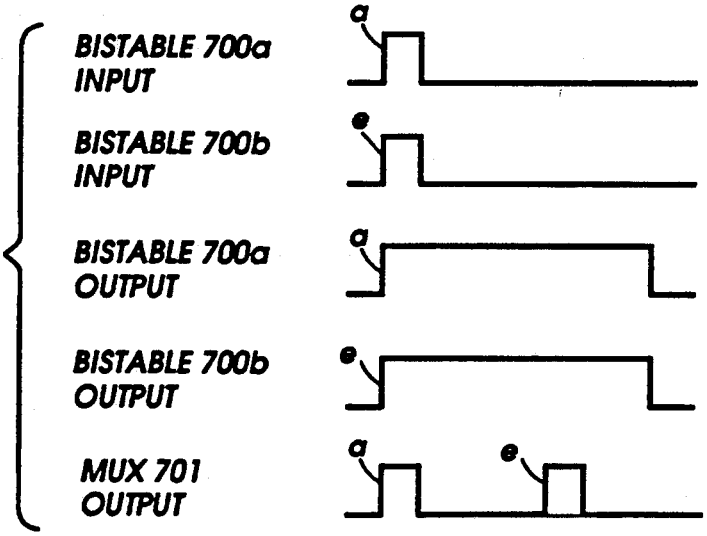

The optical switches 604 and the associated delay lines 605 can be replaced with optical bistable devices 700a and 700b of the type discussed above in a manner as illustrated in FIG. 16. These bistable devices stretch the durations of the time slots selected by the associated optical gates 602a and 602b. The time stretched signal from each of the bistable devices 700a and 700b (see FIG. 17C) are combined by a time division multiplexer 701 for coupling to an end of the optical transmission medium 606. In this way, the amount of light propagating through the transmission line is significantly increased. At the receiving end, the electrically converted signal from the converter 607 is applied to a time division demultiplexer 702 for coupling demultiplexed signals a and e to the video monitors 609a and 609b, respectively.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:
1. A time and wavelength switch comprising:
a plurality of wavelength selector means each having a signal input terminal and a signal output terminal, the input terminal of each said selector means receiving a plurality of incoming time division multiplexed (TDM) channels of different optical wavelengths, each said wavelength selector means being capable of selecting, in response to a first, wavelength switching signal applied thereto, one of said incoming TDM channels which is carried on a first wavelength and allowing said selected TDM channel to appear at the output terminal thereof; and
a plurality of time-slot switching and wavelength conversion stages associated respectively with said plural wavelength selector means, each of said stages having a single input terminal connected to the output terminal of the associated wavelength selector means and a single output terminal of said stage and being capable of deriving from a first time slot of the selected TDM channel an output signal of a second time slot carried on a second wavelength in response to a second, time-slot switching signal applied thereto and a third, wavelength switching signal applied thereto and allowing said output signal to appear at the output terminal thereof.

2. A time and wavelength switch as claimed in claim 1, wherein said time-slot switching and wavelength conversion stages comprise:
a plurality of time-slot switching means connected respectively to the outputs of said wavelength selector means for switching said first time slot in response to said second, time-slot switching signal of said selected TDM channel to said second time slot; and
a plurality of wavelength convertor means connected respectively to the outputs of said time-slot switching means for converting the wavelength of said second time slot to said second wavelength in response to said third, wavelength switching signal.

3. A time wavelength switch as claimed in claim 1, wherein said time-slot switching and wavelength conversion stages comprise:
a plurality of wavelength converter means connected respectively to the outputs of said wavelength selector means for converting the wavelength of said selected TDM channel to said second wavelength in response to said third, wavelength switching signal;
a plurality of time-slot switching means connected respectively to the outputs of said wavelength convertor means for switching said first time slot of said TDM channel of said second wavelength to said second time slot in response to said second, time-slot switching signal.

4. A time and wavelength switch as claimed in claim 1, wherein said time-slot switching and wavelength conversion stages comprises:
a plurality of sets of wavelength converter means each being capable of operating in one of two discrete output levels in response to a fourth, level switching signal applied thereto and capable of converting wavelength in response to said third, wavelength switching signal;
a plurality of first optical switching means associated respectively with said sets of wavelength converter means and having input terminals connected respectively to the outputs of said wavelength selector means, each of said first optical switching means having a plurality of output terminals connected respectively to the inputs of said wavelength converter means of the associated set for coupling, in response to said second, time-slot switching signal, said selected TDM channel to one of said wavelength converter means of the associated set to cause same to convert said first wavelength of said selected TDM channel to said second wavelength; and a plurality of second optical switching means associated respectively with said sets of wavelength converter means, each of said second optical switching means having a plurality of inputs connected respectively to the outputs of said wavelength converter means of the associated set for extracting a portion of said second wavelength time coincident with said second time slot in response to said second, time-slot switching signal.

5. A time and wavelength switch as claimed in claim 4, wherein each of said wavelength converter means comprises a tunable laser diode having a bistable mode of operation.

6. A time and wavelength switch as claimed in claim 1, wherein said incoming TDM channels are supplied to an inlet highway, further comprising a branching coupler for coupling said inlet highway to said plural wavelength branching coupler for coupling said inlet highway to said plural wavelength selector means and a combining coupler for combining outputs of said time-slot switching and wavelength conversion stages to an outlet highway.

7. A time and wavelength division multiplexed optical switching system comprising:

a plurality of inlet highways to each of which a plurality of incoming TDM signals of different optical wavelengths are applied;

a plurality of first time and wavelength (T×W) switches respectively associated with said inlet highways, each of said T×W switches comprising a plurality of wavelength selector means for selecting one of the incoming TDM channels which is supplied on a first wavelength from the associated inlet highway in response to a first control signal applied thereto, and a plurality of time-slot switching and wavelength conversion stages associated respectively with said wavelength selector means, each of said stages being capable of deriving from a first time slot of a TDM channel selected by the associated T×W switch an output signal of a second time slot carried on a second wavelength in response to a second control signal applied thereto;

a plurality of branching couplers having inputs connected respectively to the outputs of said first T×W switches, said input of each of said branching couplers being branched out to a plurality of outputs thereof;

a plurality of sets of optical devices having inputs connected respectively to the outputs of said branching couplers for selecting one of said second time slot and said second wavelength;

a plurality of combining couplers having inputs connected respectively to the outputs of said optical devices, said input of each of said combining couplers being combined to an output of each of the combining couplers;

a plurality of second time and wavelength (T×W) switches connected respectively to the outputs of said combining couplers, each of said second T×W switches comprising a plurality of wavelength selector means each being capable of selecting said second wavelength in response to a third control signal applied thereto, and a plurality of time-slot switching and wavelength conversion stages connected respectively to the outputs of said wavelength selector means, each of said stages being capable of selecting said second wavelength in response to a third control signal applied thereto, and a plurality of time-slot switching and wavelength conversion stages connected respectively to the outputs of said wavelength selector means, each of said stages being capable of deriving from said second time slot of the selected second wavelength an output signal of a third time slot carried on a third wavelength in response to a fourth control signal applied thereto; and a plurality of outlet highways connected respectively to the outputs of said second T×W switches.

8. A time and wavelength division multiplexed optical switching system as claimed in claim 7, wherein said time-slot switching and wavelength conversion stages of said first or second T×W switches comprises:

a plurality of sets of wavelength converter means each being capable of operating in one of two discrete output levels in response to a fourth, level switching signal applied thereto and capable of converting wavelength in response to said third, wavelength switching signal;

a plurality of first optical switching means associated respectively with said sets of wavelength converter means and having input terminals connected respectively to the outputs of said wavelength selector means, each of said first optical switching means having a plurality of output terminals connected respectively to the inputs of said wavelength converter means of the associated set for coupling said selected TDM channel to one of said wavelength converter means of the associated set to cause same to convert said first wavelength of said selected TDM channel to said second wavelength; and a plurality of second optical switching means associated respectively with said sets of wavelength converter means, each of said second optical switching means having a plurality of inputs connected respectively to the outputs of said wavelength converter means of the associated set for extracting a portion of said second wavelength time coincident with said second time slot.

9. A time and wavelength division multiplexed optical switching system as claimed in claim 7, wherein each of said optical devices comprises an optical gate, further comprising control means for sequentially activating said optical gates of a first set associated with first inputs of said combining couplers and sequentially activating said optical gates of a second set associated with second inputs of said combining couplers at times displaced with respect to the times at which said optical gates of said first set are activated.

10. A time and wavelength division multiplexed optical switching system as claimed in claim 7, wherein said optical devices comprise a plurality of sets of wavelength filters, said wavelength filters of each set having different wavelengths from those of the same set but identical to those of the other sets, the wavelengths of the wavelength filters of a first set associated with first inputs of said combining couplers being different from the wavelengths of those of a second set associated with second inputs of said combining couplers.

11. A time and wavelength division multiplexed optical switching system as claimed in claim 7, wherein said optical devices comprise a plurality of sets of wavelength selector means each being responsive to a time-slot coincident pulse applied thereto for extracting a signal in said second time slot of said second wavelength.

12. A time and wavelength division multiplexed optical switching system as claimed in claim 7, wherein said time-slot switching and wavelength conversion stages of said first or second T×W switches comprise:
- a plurality of time-slot switching means connected respectively to the outputs of said wavelength selector means for switching said first time slot of said selected TDM channel to said second time slot; and
- a plurality of wavelength convertor means connected respectively to the outputs of said time-slot switching means for converting the wavelength of said second time slot to said second wavelength.

13. A time and wavelength division multiplexed optical switching system as claimed in claim 7, wherein said time-slot switching and wavelength conversion stages of said first or second T×W switches comprise:
- a plurality of wavelength converter means connected respectively to the outputs of said wavelength selector means for converting the wavelength of said selected TDM channel to said second wavelength; and
- a plurality of time-slot switching means connected respectively to the outputs of said wavelength convertor means for switching said first time slot of said TDM channel of said second wavelength to said second time slot.

14. A time and wavelength division multiplexed optical switching system comprising:
- a source for generating a plurality of time division multiplexed (TDM) channels of different wavelengths;
- coupling means connected to said source for coupling said TDM channels to each of a plurality of outputs thereof;
- a plurality of wavelength selector means connected respectively to the outputs of said coupling means for selecting one of said TDM channels in response to a wavelength selection command signal applied thereto;
- a plurality of optical gate means connected respectively to the outputs of said wavelength selector means for selecting a time slot of said selected TDM channel in response to a time slot selection signal applied thereto; and
- a plurality of subscriber terminals respectively associated with said optical gates, each of said terminals having an optoelectrical converter coupled through an optical transmission medium to the output of the associated optical gate.

15. A time and wavelength division multiplexed optical switching system as claimed in claim 14, further comprising a plurality of optical bistable devices having a hysteretic output level characteristic and connected respectively to the outputs of said optical gate means to maintain output signals for a aperiod longer than the duration of said time slot, and a plurality of optical gate means connected respectively to the outputs of said optical bistable devices for extracting a portion of output signals from the bistable devices in response to said time slot selection signal, said portion being longer than the duration of said time slot.

16. A time and wavelength division multiplexed optical switching system as claimed in claim 14, further comprising:
- a branching coupler for branching an output of said coupling means to a plurality of output terminals;
- a plurality of second wavelength selector means connected respectively to said output terminals of said branching coupler for selecting one of said TDM channels in response to a wavelength selection command signal applied thereto;
- a plurality of second optical gate means connected respectively to the outputs of said second wavelength selector means for selecting a time slot of said selected TDM channel in response to a time slot selection signal applied thereto;
- a plurality of controlled optical delay means connected respectively to the outputs of said optical gate means for introducing a delay time longer than the duration of the time slot to output signals of said optical gate means in the presence of a control signal applied thereto, applying the delayed signals to output terminals thereof and for coupling the output signals of optical gate means to the output terminals thereof in the absence of said control signal;
- a coupler for coupling the output terminals of said controlled optical delay means to one end of an optical transmission medium; and
- an optoelectrical converter coupled to the other end of said optical transmission medium;
- a time division demultiplexer connected to the output of said optoelectrical converter; and
- a plurality of subscriber terminals connected respectively to the outputs of said time division demultiplexer.

17. A time and wavelength division multiplexed optical switching system as claimed in claim 14, further comprising:
- a branching coupler for branching an output of said coupling means to a plurality of output terminals;
- a plurality of second wavelength selector means connected respectively to said output terminals of said branching coupler for selecting one of said TDM channels in response to a wavelength selection command signal applied thereto;
- a plurality of second optical gate means connected respectively to the outputs of said second wavelength selector means for selecting a time slot of said selected TDM channel in response to a time slot selection signal applied thereto;
- a plurality of optical bistable devices connected respectively to the outputs of said optical gate means for stretching the duration of output signals of said optical gate means in response to a control signal applied thereto;
- means for extracting portions of the outputs of said optical bistable devices at different times from each other and for coupling the extracted portions to one end of an optical transmission medium;
- an optoelectrical converter coupled to the other end of said optical transmission medium;
- a time division demultiplexer connected to the output of said optoelectrical converter; and
- a plurality of subscriber terminals connected respectively to the outputs of said time division demultiplexer.

* * * * *